US007689602B1

(12) United States Patent
Sim-Tang

(10) Patent No.: US 7,689,602 B1
(45) Date of Patent: Mar. 30, 2010

(54) METHOD OF CREATING HIERARCHICAL INDICES FOR A DISTRIBUTED OBJECT SYSTEM

(75) Inventor: Siew Yong Sim-Tang, Saratoga, CA (US)

(73) Assignee: Bakbone Software, Inc., San Diego, CA (US)

( * ) Notice: Subject to any disclaimer, the term of this patent is extended or adjusted under 35 U.S.C. 154(b) by 532 days.

(21) Appl. No.: 11/185,168

(22) Filed: Jul. 20, 2005

(51) Int. Cl.
*G06F 12/00* (2006.01)
(52) U.S. Cl. ...................... 707/204; 709/202
(58) Field of Classification Search ............ 707/7, 707/204; 709/202; 395/612
See application file for complete search history.

(56) References Cited

U.S. PATENT DOCUMENTS

| | | |
|---|---|---|
| 3,555,184 A | 1/1971 | Townley |
| 3,555,195 A | 1/1971 | Rester et al. |
| 3,555,204 A | 1/1971 | Braun |
| 3,555,251 A | 1/1971 | Shavit |
| 3,648,250 A | 3/1972 | Low et al. |
| 4,162,536 A | 7/1979 | Morley |
| 4,402,045 A | 8/1983 | Krol |
| 4,415,792 A | 11/1983 | Jordan |
| 4,450,556 A | 5/1984 | Boleda et al. |
| 4,451,108 A | 5/1984 | Skidmore |
| 4,455,483 A | 6/1984 | Schonhuber |
| 4,502,082 A | 2/1985 | Ragle et al. |
| 4,512,020 A | 4/1985 | Krol et al. |
| 4,796,260 A | 1/1989 | Schilling et al. |
| 4,882,737 A | 11/1989 | Dzung |
| 4,916,450 A | 4/1990 | Davis |

(Continued)

FOREIGN PATENT DOCUMENTS

WO  WO-98/19262 A1  5/1998
WO  WO-02/25443 A1  3/2002

OTHER PUBLICATIONS

Burton H. Bloom, Space/Time Trade-offs in Hash Coding with Allowable Errors, Communication of the ACM, vol. 13/No. 7/Jul. 1970, pp. 422-426.*

(Continued)

*Primary Examiner*—Pierre M Vital
*Assistant Examiner*—Truong V Vo
(74) *Attorney, Agent, or Firm*—Winstead PC

(57) ABSTRACT

A data management system or "DMS" provides data services to data sources associated with a set of application host servers. The data management system typically comprises one or more regions, with each region having one or more clusters. A given cluster has one or more nodes that share storage. When providing continuous data protection and data distribution, the DMS nodes create distributed object storage to provide the necessary real-time data management services. The objects created by the DMS nodes are so-called active objects. The distributed object store can be built above raw storage devices, a traditional file system, a special purpose file system, a clustered file system, a database, and so on. According to the present invention, the DMS active object store provides an indexing service to the active objects. In an illustrative embodiment, any object property that has a given attribute is indexed and, as a result, the attribute becomes searchable. The DMS provides hierarchical distributed indexing using index trees to facilitate searching in a highly efficient manner.

11 Claims, 8 Drawing Sheets

U.S. PATENT DOCUMENTS

| | | | |
|---|---|---|---|
| 4,972,474 A | 11/1990 | Sabin | |
| 5,005,197 A | 4/1991 | Parsons et al. | |
| 5,148,479 A | 9/1992 | Bird et al. | |
| 5,177,796 A | 1/1993 | Feig et al. | |
| 5,224,212 A | 6/1993 | Rosenthal et al. | |
| 5,274,508 A | 12/1993 | Tan et al. | |
| 5,280,584 A | 1/1994 | Caesar et al. | |
| 5,303,393 A | 4/1994 | Noreen et al. | |
| 5,305,326 A | 4/1994 | Solomon et al. | |
| 5,311,197 A | 5/1994 | Sorden et al. | |
| 5,319,395 A | 6/1994 | Larky et al. | |
| 5,321,699 A | 6/1994 | Endoh et al. | |
| 5,363,371 A | 11/1994 | Roy et al. | |
| 5,365,516 A | 11/1994 | Jandrell | |
| 5,373,372 A | 12/1994 | Loewen | |
| 5,377,102 A | 12/1994 | Nishiishigaki | |
| 5,382,508 A | 1/1995 | Ikenoue | |
| 5,386,422 A | 1/1995 | Endoh et al. | |
| 5,387,994 A | 2/1995 | McCormack et al. | |
| 5,388,074 A | 2/1995 | Buckenmaier | |
| 5,392,209 A | 2/1995 | Eason et al. | |
| 5,396,600 A | 3/1995 | Thompson et al. | |
| 5,416,831 A | 5/1995 | Chewning, III et al. | |
| 5,424,778 A | 6/1995 | Sugiyama et al. | |
| 5,430,830 A | 7/1995 | Frank et al. | |
| 5,440,686 A | 8/1995 | Dahman et al. | |
| 5,469,444 A | 11/1995 | Endoh et al. | |
| 5,477,492 A | 12/1995 | Ohsaki et al. | |
| 5,479,654 A | 12/1995 | Squibb | |
| 5,481,531 A | 1/1996 | Yamamuro | |
| 5,499,512 A | 3/1996 | Jurewicz et al. | |
| 5,502,491 A | 3/1996 | Sugiyama et al. | |
| 5,506,965 A | 4/1996 | Naoe | |
| 5,507,024 A | 4/1996 | Richards, Jr. | |
| 5,511,212 A | 4/1996 | Rockoff | |
| 5,526,357 A | 6/1996 | Jandrell | |
| 5,537,945 A | 7/1996 | Sugihara et al. | |
| 5,560,033 A | 9/1996 | Doherty et al. | |
| 5,561,671 A | 10/1996 | Akiyama | |
| 5,583,975 A | 12/1996 | Naka et al. | |
| 5,602,638 A | 2/1997 | Boulware | |
| 5,606,601 A | 2/1997 | Witzman et al. | |
| 5,640,159 A | 6/1997 | Furlan et al. | |
| 5,644,763 A * | 7/1997 | Roy | 707/101 |
| 5,651,129 A | 7/1997 | Yokote et al. | |
| 5,657,398 A | 8/1997 | Guilak | |
| 5,678,042 A | 10/1997 | Pisello et al. | |
| 5,684,536 A | 11/1997 | Sugiyama et al. | |
| 5,684,693 A | 11/1997 | Li | |
| 5,684,774 A | 11/1997 | Yamamuro | |
| 5,724,241 A | 3/1998 | Wood et al. | |
| 5,729,743 A | 3/1998 | Squibb | |
| 5,737,399 A | 4/1998 | Witzman et al. | |
| 5,742,509 A | 4/1998 | Goldberg et al. | |
| 5,742,915 A | 4/1998 | Stafford | |
| 5,754,772 A | 5/1998 | Leaf | |
| 5,764,691 A | 6/1998 | Hennedy et al. | |
| 5,768,159 A | 6/1998 | Belkadi et al. | |
| 5,778,370 A | 7/1998 | Emerson | |
| 5,781,612 A | 7/1998 | Choi et al. | |
| 5,784,366 A | 7/1998 | Apelewicz | |
| 5,794,252 A | 8/1998 | Bailey et al. | |
| 5,805,155 A | 9/1998 | Allibhoy et al. | |
| 5,812,130 A | 9/1998 | Van Huben et al. | |
| RE35,920 E | 10/1998 | Sorden et al. | |
| 5,819,020 A | 10/1998 | Beeler, Jr. | |
| 5,822,749 A * | 10/1998 | Agarwal | 707/2 |
| 5,826,265 A | 10/1998 | Van Huben et al. | |
| 5,831,903 A | 11/1998 | Ohuchi et al. | |
| 5,841,717 A | 11/1998 | Yamaguchi | |
| 5,841,771 A | 11/1998 | Irwin et al. | |
| 5,848,072 A | 12/1998 | Prill et al. |
| 5,854,834 A | 12/1998 | Gottlieb et al. |
| 5,862,136 A | 1/1999 | Irwin |
| 5,864,875 A | 1/1999 | Van Huben et al. |
| 5,877,742 A | 3/1999 | Klink |
| 5,878,408 A | 3/1999 | Van Huben et al. |
| 5,893,119 A | 4/1999 | Squibb |
| 5,894,494 A | 4/1999 | Davidovici |
| 5,909,435 A | 6/1999 | Apelewicz |
| 5,917,429 A | 6/1999 | Otis, Jr. et al. |
| 5,918,248 A | 6/1999 | Newell et al. |
| 5,920,867 A | 7/1999 | Van Huben et al. |
| 5,920,873 A | 7/1999 | Van Huben et al. |
| 5,928,327 A | 7/1999 | Wang et al. |
| 5,930,732 A | 7/1999 | Domanik et al. |
| 5,930,762 A | 7/1999 | Masch |
| 5,931,928 A | 8/1999 | Brennan et al. |
| 5,937,168 A | 8/1999 | Anderson et al. |
| 5,940,823 A | 8/1999 | Schreiber et al. |
| 5,950,201 A | 9/1999 | Van Huben et al. |
| 5,953,729 A | 9/1999 | Cabrera et al. |
| 5,958,010 A | 9/1999 | Agarwal et al. |
| 5,966,707 A | 10/1999 | Van Huben et al. |
| 5,974,563 A | 10/1999 | Beeler, Jr. |
| 5,980,096 A | 11/1999 | Thalhammer-Reyero |
| 5,999,562 A | 12/1999 | Hennedy et al. |
| 6,005,846 A | 12/1999 | Best et al. |
| 6,005,860 A | 12/1999 | Anderson et al. |
| 6,031,848 A | 2/2000 | Brennan |
| 6,035,297 A | 3/2000 | Van Huben et al. |
| 6,047,323 A | 4/2000 | Krause |
| 6,072,185 A | 6/2000 | Arai et al. |
| 6,088,693 A | 7/2000 | Van Huben et al. |
| 6,094,654 A | 7/2000 | Van Huben et al. |
| 6,108,318 A | 8/2000 | Kolev et al. |
| 6,108,410 A | 8/2000 | Reding et al. |
| 6,154,847 A | 11/2000 | Schofield et al. |
| 6,158,019 A | 12/2000 | Squibb |
| 6,163,856 A | 12/2000 | Dion et al. |
| 6,178,121 B1 | 1/2001 | Maruyama |
| 6,181,609 B1 | 1/2001 | Muraoka |
| 6,189,016 B1 | 2/2001 | Cabrera et al. |
| 6,237,122 B1 | 5/2001 | Maki |
| 6,243,348 B1 | 6/2001 | Goodberlet |
| 6,249,824 B1 | 6/2001 | Henrichs |
| 6,366,926 B1 | 4/2002 | Pohlmann et al. |
| 6,366,988 B1 | 4/2002 | Skiba et al. |
| 6,389,427 B1 | 5/2002 | Faulkner |
| 6,393,582 B1 | 5/2002 | Klecka et al. |
| 6,397,242 B1 | 5/2002 | Devine et al. |
| 6,446,136 B1 | 9/2002 | Pohlmann et al. |
| 6,460,055 B1 | 10/2002 | Midgley et al. |
| 6,463,565 B1 | 10/2002 | Kelly et al. |
| 6,487,561 B1 | 11/2002 | Ofek et al. |
| 6,487,581 B1 | 11/2002 | Spence et al. |
| 6,502,133 B1 | 12/2002 | Baulier et al. |
| 6,526,418 B1 | 2/2003 | Midgley et al. |
| 6,611,867 B1 | 8/2003 | Bowman-Amuah |
| 6,625,623 B1 | 9/2003 | Midgley et al. |
| RE38,410 E | 1/2004 | Hersch et al. |
| 6,751,753 B2 | 6/2004 | Nguyen et al. |
| 6,779,003 B1 | 8/2004 | Midgley et al. |
| 6,785,786 B1 | 8/2004 | Gold et al. |
| 6,816,872 B1 | 11/2004 | Squibb |
| 6,823,336 B1 | 11/2004 | Srinivasan et al. |
| 6,826,711 B2 | 11/2004 | Moulton et al. |
| 6,836,756 B1 | 12/2004 | Gruber |
| 6,839,721 B2 | 1/2005 | Schwols |
| 6,839,740 B1 | 1/2005 | Kiselev |
| 6,847,984 B1 | 1/2005 | Midgley et al. |
| 6,907,551 B2 | 6/2005 | Katagiri et al. |
| 6,993,706 B2 | 1/2006 | Cook |
| 7,028,078 B1 | 4/2006 | Sharma et al. |

| | | |
|---|---|---|
| 7,039,663 B1 | 5/2006 | Federwisch et al. |
| 7,054,913 B1 | 5/2006 | Kiselev |
| 7,080,081 B2 | 7/2006 | Agarwal et al. |
| 7,092,396 B2 | 8/2006 | Lee et al. |
| 7,096,392 B2 | 8/2006 | Sim-Tang |
| 7,200,233 B1 | 4/2007 | Keller et al. |
| 7,206,805 B1 | 4/2007 | McLaughlin, Jr. |
| 7,207,224 B2 | 4/2007 | Rutt et al. |
| 7,272,613 B2 * | 9/2007 | Sim et al. .................... 707/102 |
| 7,290,056 B1 | 10/2007 | McLaughlin, Jr. |
| 7,325,159 B2 | 1/2008 | Stager et al. |
| 7,363,549 B2 | 4/2008 | Sim-Tang |
| 7,519,870 B1 | 4/2009 | Sim-Tang |
| 7,565,661 B2 | 7/2009 | Sim-Tang |
| 2001/0029520 A1 | 10/2001 | Miyazaki et al. |
| 2001/0043522 A1 | 11/2001 | Park |
| 2002/0091722 A1 | 7/2002 | Gupta et al. |
| 2002/0107860 A1 * | 8/2002 | Gobeille et al. ............. 707/101 |
| 2002/0144177 A1 | 10/2002 | Kondo et al. |
| 2002/0147807 A1 | 10/2002 | Raguseo |
| 2002/0172222 A1 | 11/2002 | Ullmann et al. |
| 2002/0178397 A1 | 11/2002 | Ueno et al. |
| 2002/0199152 A1 | 12/2002 | Garney et al. |
| 2003/0009552 A1 | 1/2003 | Benfield et al. |
| 2003/0051026 A1 | 3/2003 | Carter et al. |
| 2003/0088372 A1 | 5/2003 | Caulfield |
| 2003/0117916 A1 | 6/2003 | Makela et al. |
| 2003/0200098 A1 | 10/2003 | Geipel et al. |
| 2003/0204515 A1 * | 10/2003 | Shadmon et al. ............ 707/100 |
| 2004/0010544 A1 | 1/2004 | Slater et al. |
| 2004/0036716 A1 * | 2/2004 | Jordahl ...................... 345/713 |
| 2004/0047354 A1 | 3/2004 | Slater et al. |
| 2004/0080504 A1 | 4/2004 | Salesky et al. |
| 2004/0117715 A1 | 6/2004 | Ha et al. |
| 2004/0193594 A1 | 9/2004 | Moore et al. |
| 2004/0199486 A1 * | 10/2004 | Gopinath et al. ................ 707/1 |
| 2005/0001911 A1 | 1/2005 | Suzuki |
| 2005/0021690 A1 * | 1/2005 | Peddada .................... 709/220 |
| 2005/0076066 A1 | 4/2005 | Stakutis et al. |
| 2005/0251540 A1 | 11/2005 | Sim-Tang |
| 2005/0262097 A1 | 11/2005 | Sim-Tang et al. |
| 2005/0286440 A1 | 12/2005 | Strutt et al. |
| 2006/0020586 A1 | 1/2006 | Prompt et al. |
| 2006/0026220 A1 | 2/2006 | Margolus |
| 2006/0050970 A1 | 3/2006 | Gunatilake |
| 2006/0064416 A1 | 3/2006 | Sim-Tang |
| 2006/0101384 A1 | 5/2006 | Sim-Tang et al. |
| 2006/0130002 A1 | 6/2006 | Hirayama et al. |
| 2006/0137024 A1 | 6/2006 | Kim et al. |
| 2006/0236149 A1 | 10/2006 | Nguyen et al. |
| 2006/0259820 A1 | 11/2006 | Swoboda |
| 2006/0278004 A1 | 12/2006 | Rutt et al. |
| 2007/0067278 A1 | 3/2007 | Borodziewicz et al. |
| 2007/0094312 A1 | 4/2007 | Sim-Tang |
| 2007/0168692 A1 | 7/2007 | Quintiliano |
| 2008/0256138 A1 | 10/2008 | Sim-Tang |

OTHER PUBLICATIONS

U.S. Appl. No. 12/488,657, Sim-Tang.
U.S. Appl. No. 10/862,971, Sim-Tang.
U.S. Appl. No. 10/862,971.
U.S. Appl. No. 11/185,313, Siew Yong Sim-Tang.
U.S. Appl. No. 12/099,837, Sim-Tang, Siew Yong.
Housel et al. "WebExpress: A client/intercept based system for optimizing Web browsing in a wireless environment", Mobile Network and Applications, vol. 3, pp. 419-431, 1998, Baltzer Science Publishers.
Psounis, "Class-based Delta-encoding: A Scalable Scheme for Caching Dynamic Web Content", Proceedings of the 22nd International Conference on Distributed Computing Systems Workshops, 2002 IEEE (pp. 1-7).
Microsoft Windows Storage Server 2003, NSI Software, "Improving Business Continuity Using Windows Storage Server 2003", White Paper, Oct. 2003, pp. 1-15.
Beausoliel, Rob, "International Search Report" for PCT/U505/15651 as mailed Sep. 29, 2005. (1 page).
Abel-Jalil, Neveen, "International Search Report" for PCT/U505/32958 as mailed Jul. 8, 2008. (1 page).
Thomson, William, "International Search Report" for PCT/U505/39709 as mailed Oct. 16, 2007. (1 page).
Vo, Tim, "International Search Report" for PCT/U505/15662 as mailed Feb. 1, 2008. (2 pages).
Zhen, Li B., "International Search Report" for PCT/US05/15653 as mailed Nov. 30, 2006. (3 pages).
Thomas Plagemann, Towards Middleware Services for Mobile Ad-Hoc Network Applications, May 2003,IEEE (FTDCS'03), pp. 1-7.

* cited by examiner

DMS Object Instance Hierarchy

METHOD OF CREATING HIERARCHICAL INDICES FOR A DISTRIBUTED OBJECT SYSTEM

CROSS-REFERENCE TO RELATED APPLICATIONS

This application is related to commonly-owned application:

Ser. No. 11/123,994, filed May 6, 2005, and titled "SYSTEM FOR MOVING REAL-TIME DATA EVENTS ACROSS A PLURALITY OF DEVICES IN A NETWORK FOR SIMULTANEOUS DATA PROTECTION, REPLICATION, AND ACCESS SERVICES.

BACKGROUND OF THE INVENTION

1. Technical Field

The present invention relates generally to enterprise data management.

2. Background of the Related Art

A critical information technology (IT) problem is how to cost-effectively deliver network wide data protection and rapid data recovery. In 2002, for example, companies spent an estimated $50 B worldwide managing data backup/restore and an estimated $30 B in system downtime costs. The "code red" virus alone cost an estimated $2.8 B in downtime, data loss, and recovery. The reason for these staggering costs is simple—traditional schedule based tape and in-storage data protection and recovery approaches can no longer keep pace with rapid data growth, geographically distributed operations, and the real time requirements of 24×7×365 enterprise data centers.

Traditionally, system managers have used tape backup devices on a periodic basis to store application and system data, or to generate volume snapshots of a primary storage. Conventional tape backup tools typically extract data from an application, dump the data into one or more tapes, and then make a catalog that associates the data and the particular tapes, as well as offset data within a tape. The application data can be re-introduced to the application at a later time in the event of a failure event. Volume snapshot tools, on the other hand, provide the ability to acquire a "snapshot" of the contents of an entire hard disk at a particular time and then store this for later use, e.g., reintroduction onto the disk (or onto a new disk) should the computer fail. The problems with these backup approaches are well known and appreciated. First, changes in data occurring after a backup or snapshot are always at risk and may be lost. Second, tape backup requires that the host application be shutdown or to be put into a backup mode for a long time period until the complete data set is copied to tape. Third, as the data size grows, the bandwidth required to offload data repeatedly, and the attendant storage required to store the complete snapshots, can become impractical quickly. Further, during a "hot" snapshot critical data can change, which may result in an incomplete update being captured (e.g., only one portion of a transaction) such that, when reintroduced, the data is not fully consistent. Most importantly, storage based snapshot does not capture fine grain application data and, therefore, it cannot recover fine grain application data objects without reintroducing (i.e. recovering) the entire backup volume to a new application computer server to extract the fine grain data object.

Data recovery on a conventional data protection system is a tedious and time consuming operation. It involves first shutting down a host server, and then selecting a version of the data history. That selected version of the data history must then be copied back to the host server, and then the host server must be re-started. All of these steps are manually driven. After a period of time, the conventional data protection system must then perform a backup on the changed data. As these separate and distinct processes and systems are carried out, there are significant periods of application downtime. Stated another way, with the current state of the art, the processes of initial data upload, scheduled or continuous backup, data resynchronization, and data recovery, are separate and distinct, include many manual steps, and involve different and uncoordinated systems, processes and operations. The volume snapshot tools are not able to recover granular objects, the tape backup tools are not capable of searching for protected objects over time. None of these tools are capable of indexing objects across multiple arrays and hosts, and they are not capable of locating protected objects that existed in any point-in-time in the past.

The current invention not only protect data in real-time in a distributed network, it is capable of capturing consistency events, and then index the protected information with time and events. By doing so, the current invention allows one to search for an object of any granularity (a database, a file, a message, a volume, etc.) across a distributed network and across history.

BRIEF SUMMARY OF THE INVENTION

A data management system or "DMS" provides a wide range of data services to data sources associated with a set of application host servers. The data management system typically comprises one or more regions, with each region having one or more clusters. A given cluster has one or more nodes that share storage. When providing continuous data protection and data distribution, the DMS nodes create distributed object storage to provide the necessary real-time data management services. The objects created by the DMS nodes are so-called active objects. The active objects at any moment in time may be dormant in the storage or instantiated by the DMS nodes to handle requests and to perform activities. The distributed object store can be built above raw storage devices, a traditional file system, a special purpose file system, a clustered file system, a database, and so on. According to the present invention, the DMS active object store provides an indexing service to the active objects. In an illustrative embodiment, any object property that has a given attribute is indexed and, as a result, the attribute becomes searchable. The DMS provides hierarchical distributed indexing using index trees to facilitate searching in a highly efficient manner.

In one embodiment, a DMS index tree maps into both a logical data network and a physical DMS network. The index tree typically comprises a root, and one or more levels of branches (joins) that subsequently terminate in a set of leaves. A given leaf in the index tree typically is associated with a sorted structure such as a BTree, B+Tree, a simple sorted list of entries, or the like. Preferably, a sort entry in the sorted structure comprises an object property value, an object GUID, timestamp data, and the like. A sorted structure has an associated hash key, and this key is re-computed whenever the sorted structure is modified. The leaves (i.e., the sorted structures) of the index tree map to logical data in a data source and the joins are used to aggregate the leaves. In DMS, a join above one or more leaves aggregates leaves that are in a given DMS cluster, and a join on a next level up in the index tree aggregates the joins of multiple clusters that belong to a given DMS region. A join above one or more regions typically is the root of the index tree. In this manner, the joins in the index tree aggregate the sorted structures of multiple data sources from one or more clusters, within and across multiple regions.

In one embodiment, an Index Manager (e.g., software in the form of a set of instructions executable in one or more processor(s)) runs on each DMS cluster. The Index Manager is responsible for maintaining the sorted structures in the particular DMS cluster. It adds new property entries into the appropriate sorted structure, removes entries, or modifies the entries as requested by the active objects. When an entry is added, moved, or modified, the Index Manager for the cluster re-calculates the membership key for the individual sorted structure, as well as the membership key for the overall DMS cluster (i.e. the key for each join). The Index Manager upon modifying the membership key of its sorted structure or its DMS cluster, may distributes the membership key to other Index Managers in the DMS network. When an Index Manager receives a membership key of another cluster, or when its own cluster key changes, that Index Manager re-calculates the membership keys of the associated region, and it also re-computes the membership key for the all the DMS regions (i.e., a "universe"). In the preferred embodiment, each Index Manager in the DMS only has visibility to the sorted structures in its own cluster, but all Index Managers maintain a copy of an index tree that contains all membership keys.

When an Index Manager propagates its cluster membership key (as well as all the keys of its protected data source(s)), other Index Managers in the DMS network can build up their index trees. As noted above, preferably a given Index Manager's (through its index tree) only has access to the sorted structure entries of its own cluster.

The index trees are used to respond to search requests, which typically are directed to DMS nodes in a cluster, e.g., through a GUI, CLI or other interface. When a search request (e.g., LOOKUP clsFile NAME="foo") arrives at any one of the DMS nodes in a cluster, the cluster's Index Manager in the node traverses its index tree, starting from the universe down to the region, cluster, and the sorted structure, to perform a membership test. In this example, the Index Manager first tests the requested object ("foo") using the universe membership key. If the test fails, the Index Manager declares that the search value does not exist in the entire network, and no more processing is required. If the test on the universe key is successful, then the Index Manager performs a membership test on region membership keys in the next level down in the tree; whichever test returns TRUE, the Index Manager may traverse further down the index tree to perform more membership tests on the cluster and, finally, on a given sorted structure within a cluster. A FALSE result from the membership test on any of the membership keys results in the associated branch of the index tree being eliminated for further traversal and search. Only the sorted structure whose membership key agrees with the search criteria during the membership test has to be iterated and searched. This means that searching for an object in an entire DMS network takes a very short amount of time and is very efficient.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN EMBODIMENT

Figure 1:
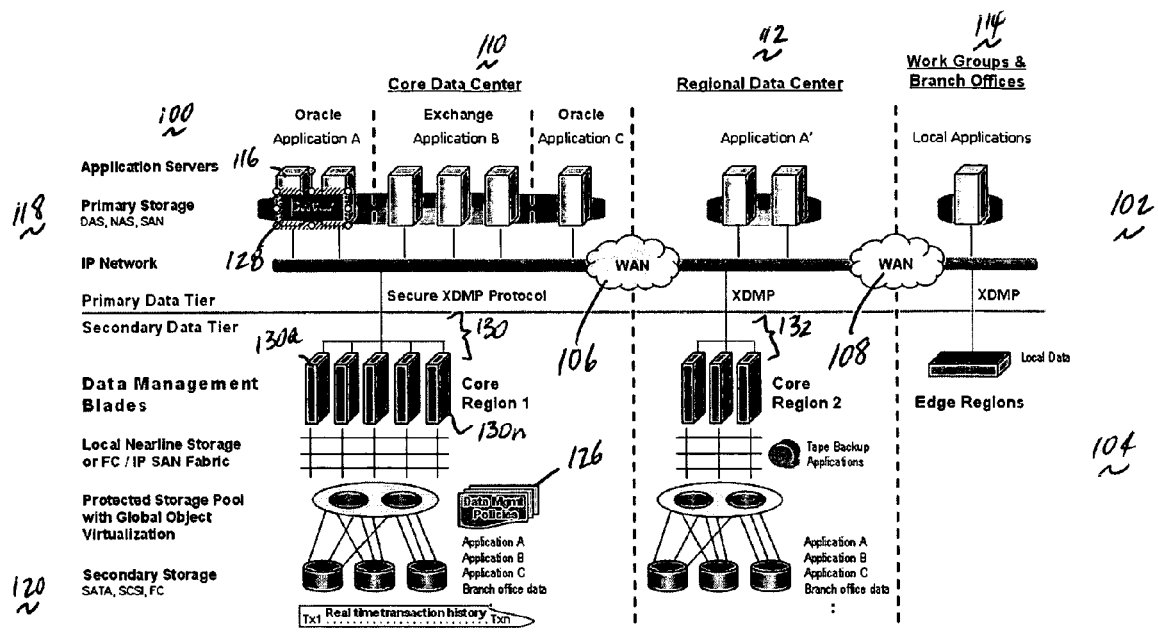
FIG. 1 is an illustrative enterprise network in which the present invention may be deployed.

FIG. 1 illustrates a representative enterprise 100 in which the present invention may be implemented. This architecture is meant to be taken by way of illustration and not to limit the applicability of the present invention. In this illustrative example, the enterprise 100 comprises a primary data tier 102 and a secondary data tier 104 distributed over IP-based wide area networks 106 and 108. Wide area network 106 interconnects two primary data centers 110 and 112, and wide area network 108 interconnects a regional or satellite office 114 to the rest of the enterprise. The primary data tier 102 comprises application servers 116 running various applications such as databases, email servers, file servers, and the like, together with associated primary storage 118 (e.g., direct attached storage (DAS), network attached storage (NAS), storage area network (SAN)). The secondary data tier 104 typically comprises one or more data management server nodes, and secondary storage 120, which may be DAS, NAS, and SAN. The secondary storage may be serial ATA interconnection through SCSI, Fibre Channel (FC or the like), or iSCSI. The data management server nodes create a logical layer that offers object virtualization and protected data storage. The secondary data tier is interconnected to the primary data tier, preferably through one or more host drivers (as described below) to provide real-time data services. Preferably, and as described below, the real-time data services are provided through a given I/O protocol for data transfer. Data management policies 126 are implemented across the secondary storage in a well-known manner. A similar architecture is provided in data center 112. In this example, the regional office 114 may not have its own secondary storage, but relies instead on the facilities in the primary data centers.

A "host driver" 128 is associated with one or more of the application(s) running in the application servers 116 to transparently and efficiently capture the real-time, continuous history of all (or substantially all) transactions and changes to data associated with such application(s) across the enterprise network. The host driver facilitates real-time, so-called "application aware" protection, with substantially no data loss, to provide continuous data protection and other data services (described in more detail below) including, without limitation, data distribution, data replication, data copy, data access, and the like. In operation, a given host driver 128 intercepts data events between an application and its primary data storage, and it may also receive data and application events directly from the application and database. In a representative embodiment, the host driver 128 is embedded in the host application server 116 where the application resides; alternatively, the host driver is embedded in the network on the application data path. By intercepting data through the application, fine grain (but opaque) data is captured to facilitate the data service(s). To this end, and as also illustrated in FIG. 1, each of the primary data centers includes a set of one or more data management servers 130a-n that cooperate with the host drivers 128 to facilitate the data services. In this illustrative example, the data center 110 supports a first core region 130, and the data center 112 supports a second core region 132. A given data management server 130 is implemented using commodity hardware and software (e.g., an Intel processor-based blade server running Linux operating system, or the like) and having associated disk storage and memory. Generalizing, the host drivers 128 and data management servers 130 comprise a data management system (DMS) that provides potentially global data services across the enterprise.

Figure 2:
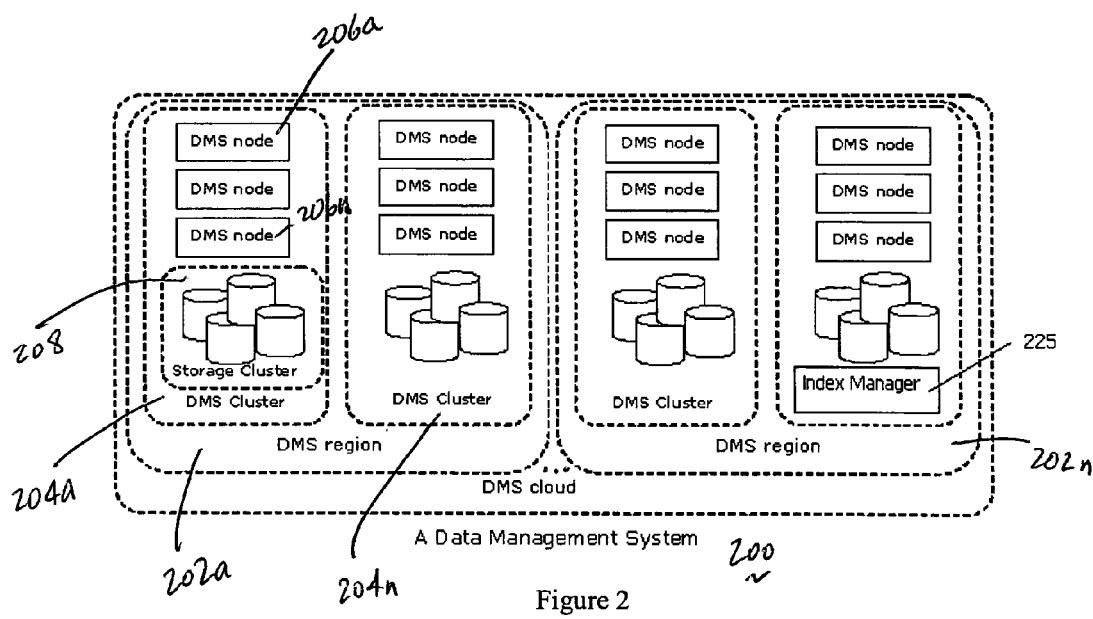
FIG. 2 is an illustration of a general data management system (DMS) of the present invention.

FIG. 2 illustrates a preferred hierarchical structure of a data management system 200. As illustrated, the data management system 200 comprises one or more regions 202a-n, with each region 202 comprising one or more clusters 204a-n. A given cluster 204 includes one or more nodes 206a-n and a shared storage 208 shared by the nodes 206 within the cluster 204. A given node 206 is a data management server as described above with respect to FIG. 1. Within a DMS cluster 204, preferably all the nodes 206 perform parallel access to the data in the shared storage 208. Preferably, the nodes 206 are hot swappable to enable new nodes to be added and existing nodes to be removed without causing cluster downtime. Preferably, a cluster is a tightly-coupled, share everything grouping of nodes. At a higher level, the DMS is a loosely-coupled share nothing grouping of DMS clusters. Preferably, all DMS clusters have shared knowledge of the entire network, and all clusters preferably share partial or summary information about the data that they possess. Network connections (e.g., sessions) to one DMS node in a DMS cluster may be redirected to another DMS node in another cluster when data is not present in the first DMS cluster but may be present in the second DMS cluster. Also, new DMS clusters may be added to the DMS cloud without interfering with the operation of the existing DMS clusters. When a DMS cluster fails, its data may be accessed in another cluster transparently, and its data service responsibility may be passed on to another DMS cluster.

Figure 3:
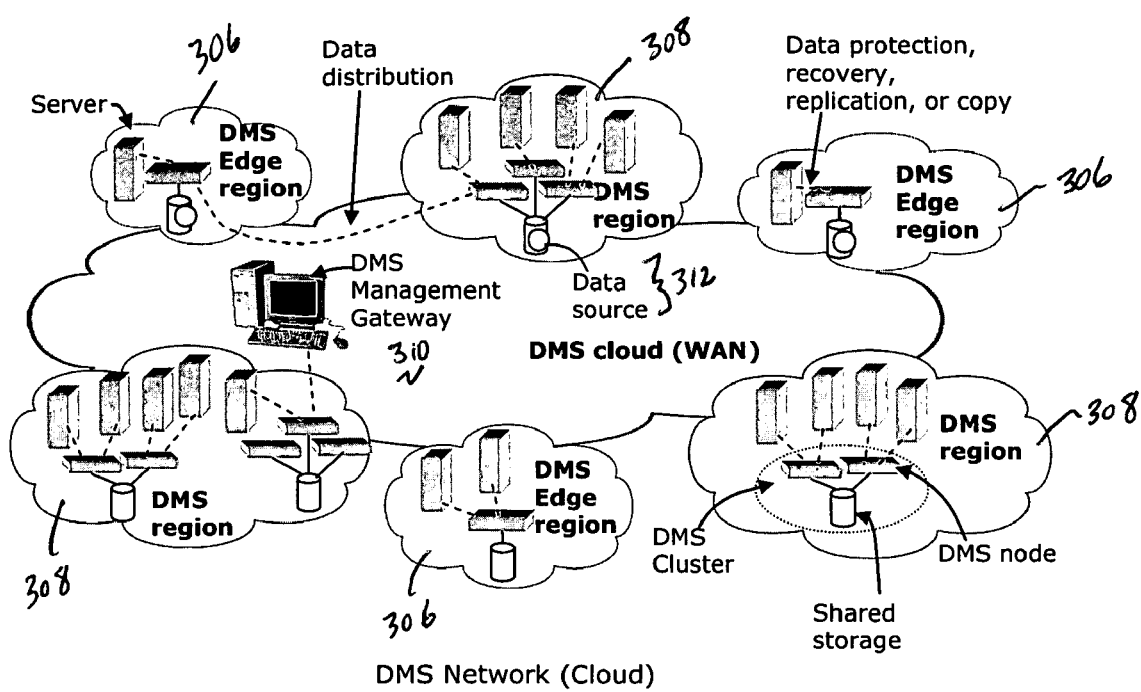
FIG. 3 is an illustration of a representative DMS network according to one embodiment of the present invention.

FIG. 3 illustrates the data management system (DMS) as a network (in effect, a wide area network "cloud") of peer-to-peer DMS service nodes. As discussed above with respect to FIG. 2, the DMS cloud 300 typically comprises one or more DMS regions, with each region comprising one or more DMS "clusters." In the illustrative embodiment of FIG. 3, typically there are two different types of DMS regions, in this example an "edge" region 306 and a "core" region 308. This nomenclature is not to be taken to limit the invention, of course. As illustrated in FIG. 1, an edge region 306 typically is a smaller office or data center where the amount of data hosted is limited and/or where a single node DMS cluster is sufficient to provide necessary data services. Typically, core regions 308 are medium or large size data centers where one or more multi-node clusters are required or desired to provide the necessary data services. The DMS preferably also includes a management gateway 310 for controlling the system. As seen in FIG. 3, conceptually the DMS can be visualized as a set of data sources 312. A data source is a representation of a related group of fine grain data. For example, a data source may be a directory of files and subdirectory, or it may be a database, or a combination of both. A data source 312 inside a DMS cluster captures a range of history and continuous changes of, for example, an external data source in a host server. A data source may reside in one cluster, and it may replicate to other clusters or regions based on subscription rules. If a data source exists in the storage of a DMS cluster, preferably it can be accessed through any one of the DMS nodes in that cluster. If a data source does not exist in a DMS cluster, then the requesting session may be redirected to another DMS cluster that has the data; alternatively, the current DMS cluster may perform an on-demand caching to bring in the data.

DMS offers a wide range of data services. The data services include, by way of example only: data protection (and recovery), disaster recovery (data distribution and data replication), data copy, and data query and access. The data services and, in particular, data protection and disaster recovery, preferably are stream based data services where meaningful application and data events are forwarded from one end point to another end point continuously as a stream. More generally, a stream-based data service is a service that involves two end points sending a stream of real-time application and data events. For data protection, this means streaming data from a data source (e.g., an external host server) into a DMS cluster, where the data source and its entire history can be captured and protected. Data distribution refers to streaming a data source from one DMS cluster into another DMS cluster, while data replication refers to streaming a data source from a DMS cluster to another external host server. Preferably, both data distribution and data replication are real-time continuous movement of a data source from one location to another to prepare for disaster recovery. Data replication differs from data distribution in that, in the latter case, the data source is replicated within the DMS network where the history of the data source is maintained. Data replication typically is host based replication, where the continuous events and changes are applied to the host data such that the data is overwritten by the latest events; therefore, the history is lost. Data copy is a data access service where a consistent data source (or part of a data source) at any point-in-time can be constructed and retrieved. This data service allows data of the most current point-in-time, or any point-in-time in the past, to be retrieved when the data is in a consistent state.

The DMS nodes are the entities that provides real-time data services. When providing continuous data protection and data distribution as subscriber, the nodes take incoming data streams, translate the streams into an object-oriented data structure, and save the data in a storage module that is referred to herein as an object store. The object store is designed with the purpose of managing real-time continuous history. When providing data replication, data recovery, and generating a snapshot, the DMS node navigates its object store, reconstructs a desired point-in-time data object, and forms outbound data streams that are then delivered to target nodes or host machines. To provide continuous replication, once replicating a point-in-time data object, the DMS node also forwards, to a remote DMS or a remote host server, a continuous redo log of the objects (in the form of a real-time event journal). A goal of the DMS is to store fine grain and real-time data history. Thus, the DMS object store is designed to track fine grain data changes without using excessive storage. The DMS preferably also indexes by time all fine grain objects, application checkpoints, and metadata globally across DMS clusters.

As described in Ser. No. 11/123,994, filed May 6, 2005, the DMS nodes create distributed object storage to provide the necessary real-time data management services. The objects created by the DMS nodes are called active objects. The active objects at any moment in time may be dormant in the storage or instantiated by the DMS nodes to handle requests and to perform activities. The details of active objects are discussed in the following sections.

The distributed object store can be built above raw storage devices, a traditional file system, a special purpose file system, a clustered file system, a database, and so on. Preferably, DMS chooses to build the distributed object store over a special purpose file system for storage and access efficiency. The files in the special purpose file system and the active objects in the DMS preferably are all addressed by a 128 bit global unique identifier (GUID). During runtime, a GUID can be de-referenced to a physical address in a storage device. By doing so, this allows the object store to scale beyond a single storage device, such that an object (1) in a device (A) can refer to another object (2) in device (B), e.g., by referring to the GUID of object (2).

Preferably, each DMS node executes an object runtime environment. This object runtime environment includes an object manager that manages the lifecycle of all the DMS objects during runtime. The object manager creates DMS objects, the active objects, and the object manager saves them in the shared storage. When requested, the object manager loads an existing active object from the storage, and then routes object requests directly to the instantiated active object. Once an active object is created or loaded (instantiated) into the memory, it is responsible for executing requests routed from the object manager. The object manager performs necessary authentication and authorization before allowing any access to an active object. An active object, upon request, may update its internal information, execute an object specific program, and terminate itself from the runtime environment. Both the object manager and the active objects are responsible for acquiring shared lock as necessary so that all the nodes can have parallel access to the same objects. The object manager is also responsible for permanently removing active objects from the shared storage when requested.

An instance of an active object has a set of properties, with each property having a label and value pair. For example, an active object may have one property labeled as "name" with an associated value being "The design of a PC," and another property labeled "content" which associated value is a binary blob. A property has a value type definition, for example, the value of the "name" property is a string, and the value of the "content" property is an opaque binary chunk of data.

For example, when DMS protects a file from server, the DMS active object for the file may have a list of properties such as: ObjectClass (a file object class identifier), ObjGUID (a unique identifier), Creator (a user identifier), ExternalCreationDateTime (a timestamp), DMSCreationDateTime (a timestamp), Name (a string), ParentObject (a GUID of a directory object), ACL (an object GUID), Version (an integer or timestamp), k Size (an integer), ExternalModified DateTime (a timestamp), DMSModifiedDateTime (a time stamp), DMSTerminationDateTime (a timestamp), ModifiedBy (a user identifier), Company (a string), Department (a string), Title (a string), Subject (a string), Keywords (a string), Comments (a string), and Content (a random binary blob). In the context of a traditional file system, preferably all properties beside the "content" property are classified as metadata whereas, in the DMS, preferably all properties including the "content" itself are managed as metadata. The DMS active objects store metadata from the protected server as well as metadata generated by the DMS itself. In DMS active object point of view, all the properties are metadata, including the binary content from the external world, while binary content is just a specific property type (random access binary blob type). Some object properties, such as ObjectClass, ObjGUID, Creator, ExternalCreationDateTime, and DMSCreationDateTime do not change once the object is created, while the other properties can be modified. There are also properties, such as Version, DMSModifiedDateTime, and DMSTerminationDateTime, that are not modifiable by any external entity besides the Object Manager and the object itself.

A property on an active object preferably also has specific attributes such as—modifiable, modifiable-internal, read-able, version-able, single-value vs multi-value, inheritable, index, mandatory, replicate-able, and the like. A modifiable property if true is one that can be modified by an internal or external request. A modifiable-internal property if true is one that can be modified by the DMS internally. A read-able property if true can be accessed by external request. A version-able property if true is a property that can versioned. A multi-value property if true is a property with many values; if false, the property is a single value property. An inheritable property, if true, enables an object to request a value from its parent in the object hierarchy; by default all properties are not inheritable. An index property, if true, enables DMS to automatically index the property. Once indexed, the object can be searched using the index of the property. The indexed property is, for example, name, fingerprint, or the like. By default, a property is not indexed. If a property is not indexed, it is still searchable by an algorithm iterating through all the objects, otherwise, efficient search process an be carried out as will be described below. If the replicate-able property is true, then the property is replicated when the object is replicated.

As further described in Ser. No. 11/123,994, filed May 6, 2005, an active object has a basic set of behaviors and some specific set of behaviors created specifically for the class definition. The following are examples of the basic set of behaviors that may be initiated by the interface for life cycle management, getting and setting attributes:

CreateObject (of a specific class)
    DestroyObject (an object GUID)
    ObjectOpen (an object GUID, a point-in-time, and mode)
    ObjectClose (an opened object handle)
    ObjectTerminate (an opened object handle)
    ObjectLock (an opened object handle, and mode)
    ObjectGet (an opened object handle, a list of properties)
    ObjectSet (an opened object handle, a property, a value)
    ObjectMVGetFirst (an opened object handle, a property)
    ObjectMVGetNext (an opened object handle, a property)
    ObjectMVGet (an opened object handle, a property, key)
    ObjectMVAdd (an opened object handle, a property, value)
    ObjectMVDelete (an opened object handle, a property, key)
    ObjectRead (an opened object handle, a property, an offset, a length)

ObjectWrite (an opened object handle, a property, an offset, a length, data)

ObjectApply (an opened object handle, a property, a delta string)

ObjectRecordAppend (an opened object handle, a property, record, length)

ObjectRecordGetFirst (an opened object handle, a property)

ObjectRecordGetNext (an opened object handle, a property)

ObjectRecordGetAt (an opened object handle, a property, a position)

ObjectExecute (an open object handle, a function, parameters)

These functions may be implemented readily in software code, i.e., as a set of program instructions executable in a processor. CreateObject( ) creates a physical active object in the DMS object store, while DestroyObject( ) removes the physical object completely. Once created, an active object can be instantiated by ObjectOpen( ) and it can be manipulated. ObjectClose( ) ends the execution cycle of an object. ObjectTerminate( ) terminates an object version and prevents a new version from ever be created. ObjectGet( ) and ObjectSet( ) are for accessing a single value property; the generic behavior for setting a property is to first validate the property type before allowing the update to occur. ObjectMVGetFirst( ), ObjectMVGetNext( ), ObjectMVGet( ), ObjectMVAdd( ), and ObjectMVDelete( ) are for accessing a multi-value property. A multi-value property has unique key, for example, CHILDREN may be a multi-value property, and its unique key may be the name or the GUID of the child. Object Read( ), ObjectWrite( ), and ObjectApply( ) are for accessing metadata of a random access binary blob type. Object RecordAppend( ), ObjectRecordGetFirst( ), Object RecordGetNext( ), and ObjectRecordGetAt( ) are for accessing metadata of sequential access binary blob type.

The above object interfaces are a representative subset of the actual basic object behaviors of the DMS. There are merely illustrative of the functional behavior of the active objects. If desired, an object class may define its own set of specific behaviors.

DMS Object Instance Hierarchy

To provide real-time data management services, DMS preferably defines a set of data management specific object schemas. These object schemas are used to create the "active" objects that have specific metadata and behaviors as defined in the schema. The DMS object definition set forth below is a preferred way of organizing the control, data, and functional structure for the DMS to provide real-time data management services.

The schema clsDMSSystem is a class for creating a DMS cloud active object that represents the logical network of the entire DMS system (with multiple DMS clusters over multiple regions). Preferably, there is only one instance of clsDMSSystem in a DMS network, as it is the root object instance of the entire DMS network. Preferably, this object is used for tracking DMS regions (each as an instance of a clsRegion schema as described below) and DMS functional groups that own data across regions (each as an instance of a clsGroup schema as described below). The instance typically has a randomly assigned unique identifier. The instance preferably is created automatically by the DMS network when a first cluster is configured, i.e. it is created by a first node. This object instance is populated to all the storage clusters in the entire DMS network. Preferably, there is only one master copy of this object, which is the original copy, the one that was created first. When the properties of the instance change, the properties are populated to all replicas.

The schema clsRegion is a class for creating DMS region active objects that represents and tracks a DMS cluster network, data network, and server network. Preferably, there is one instance of clsRegion in each physical location. An active object instance of clsRegion is used for tracking all the DMS clusters (each as an instance of a clsCluster schema as described below), repositories (each as an instance of a clsRepository schema as described below), and host servers (each as an instance of a clsHost schema as described below) in the region. Because each region may have multiple storage clusters, the local instance of the clsRegion object is replicated to all the local storage clusters. The GUID of each instance of clsRegion are randomly assigned when created.

The schema clsRepository is a class for creating a DMS data container for storing protected data sources. A repository instance may have sub-repository instances and/or protected data sources. A root repository object that is directly under a region represents a segment of a data network. A repository may be a child of a region or a child of another repository. The child of a region is the root of a DMS data object hierarchy. The repository object provides regional data grouping and policy enforcement. The policies in a repository are executed against all the data sources within the scope of the repository.

The schema clsXXDataSource is a class for creating data sources. Preferably there are three data source schemas, clsFSDataSource, clsDatabaseDataSource, clsCompoundDataSource. An active object instance of a clsXXDataSource is a root container for a protected data source where a data source from a host is streamed. An instance of clsFSDataSource contains a file, a directory, or a volume of a file system and its history, while an instance of a clsDatabaseDataSource contains one or more databases and their history from a database server. An instance of a clsCompoundDataSource is a container for multiple data source instances. Unlike a repository that only provides logical containership, a compound data source instance provides sequencing and consistency marking to the real-time activities of its related group of data sources so that group consistency can be maintained.

The class clsFile is a schema for creating object instances for the DMS to store the information of a file from a host server and also to track the history of that file in the host. An instance of a clsFile is similar to a file in a file system, except that an instance captures and manages file history. In DMS, this object is used for data protection, with each instance of clsFile used to represent an external file in an external host.

The class clsDirectory is a schema for creating object instances for the DMS to store the information of a directory from a host server and also to track the history of that directory in the host. An instance of a directory simply represents a container of files and other sub-directories.

The class clsDatabase is a schema for creating object instances for the DMS to store the information of a database within a database server, and also for tracking the history and checkpoints of that database in the server. This object is used to provide database protection services. An instance of a clsDatabase represents a consistent range of time of a database in an external server.

The class clsJournalGroup is a schema for creating object instances for the DMS to journal the redo and undo log (journal) activities of a database. The database journal activities may be updates to a group of related journal log files, or application level transaction activities.

The class clsRecordFile is a schema for creating object instances for the DMS to track sequential journal entries within a journal group.

An active object instance of the clsHost is created whenever a host driver from a new host server first connects to the DMS network. This object allows the DMS to track the data services provided to the information on the host. This object also associates the protected data sources in the DMS to the data source on its host server. An instance of clsHost preferably contains information such as the platform of the host, the operating system, the host configuration, data sources that are protected from the host, DMS data sources that are replicated to the host, and the like. The protected or replicated data source properties preferably include the host path, the size of the sources in the host, the activities and statistical information about those data sources, and the GUID of the clsXXDataSource instance.

An active object instance of the clsDMSCluster schema represents a DMS cluster with one or more DMS nodes and the DMS storage. This instance provides statistics and status information of its specific cluster. Typically, there is only instance per storage cluster, thus the processes (e.g., the object runtime environment) of all the nodes use this instance as shared memory to keep information such as node availability, master election, and the like. Information about a DMS cluster (as instances of a clsDMSCluster), a DMS node (as instances of clsDMSNode), and DMS storage (as instances of clsDMSStorage) may be stored together with the other active objects or may be in a specific volume used exclusively by the cluster manager.

An active object instance of the clsDMSNode schema represents a DMS node within a DMS cluster. This instance provides statistics and status information about the DMS node it represents. Preferably, the object runtime environment of a node is responsible for locating a cluster and joining that cluster. Once joined in a cluster, the runtime environment creates the clsDMSNode instance.

An active object instance of the clsDMSStorage schema represents the storage volumes of a DMS cluster. This instance allows the DMS storage to be configured, and it also provides statistics and status information of the storage volumes.

An active object instance of the clsGroup schema is a data container that also represents a logical group in an organization. This allows user to map data sources from one or multiple repositories in one or more regions to a functional group of an organization. Its purpose is to enable an administrator or other permitted entity to assign data management policy across multiple regions.

An active instance of the clsPolicyProfile schema contains a set of data management policies. There may be one or many policy profiles in the DMS network. A policy profile object can be assigned (as a default data management policy) to any data container, such as the universe, regions, repositories, groups, or protected data sources, or to any data object, such as files, directories, and databases. When assigned to a container, all sub-containers or the data objects within that root container are governed by the set of policy rules. As noted above, a region (or a repository) object allow an administrator to set policies for data in the same region, while a functional group object allows an administrator to set policies for data in multiple regions. Typically, a policy is a combination of a set of properties, e.g., a rule, an override rule, one or more qualifying events, one or more qualifying property values, and/or a schedule. A rule may be a Boolean expression with an action, and a rule may be nested.

Similar to an instance of a clsPolicyProfile object, an active object instance of a clsPolicyOverride also contains a subset of data management policies. When assigned to a data container or data object, the policies in the override object takes precedent over the default policy on an assigned policy profile objects.

In a DMS cluster, preferably DMS active objects are grouped in such a way that each data source and its children (i.e., all the data objects in that scope) are stored within a logical volume called a storage group, and all the other DMS system objects such as the DMSSystem, Region, Group, Repository, Host, Cluster, Node, and Storage active objects (configuration and control objects) are in yet another logical volume (storage group). In each storage group (logical volume), preferably all object updates are logged into a write-ahead log with redo and undo entries similar to that of a database. The redo entries preferably have a similar format to the real-time event journal stream. To provide real-time data distribution and replication services, the DMS may first ship the initial active objects from a storage group and then in real-time forward the redo log (similar to the real-time event journal) to apply on the remote end, which can be another DMS node or a remote host for the data distribution and replication service. Alternatively, the DMS can provide real-time distribution and replication on a per object basis. In this case, instead of forwarding the redo log from an entire storage group (i.e. data source, or system objects), each active object may forward its own changes to a remote replicated object either in another DMS node or a host server.

Figure 4:
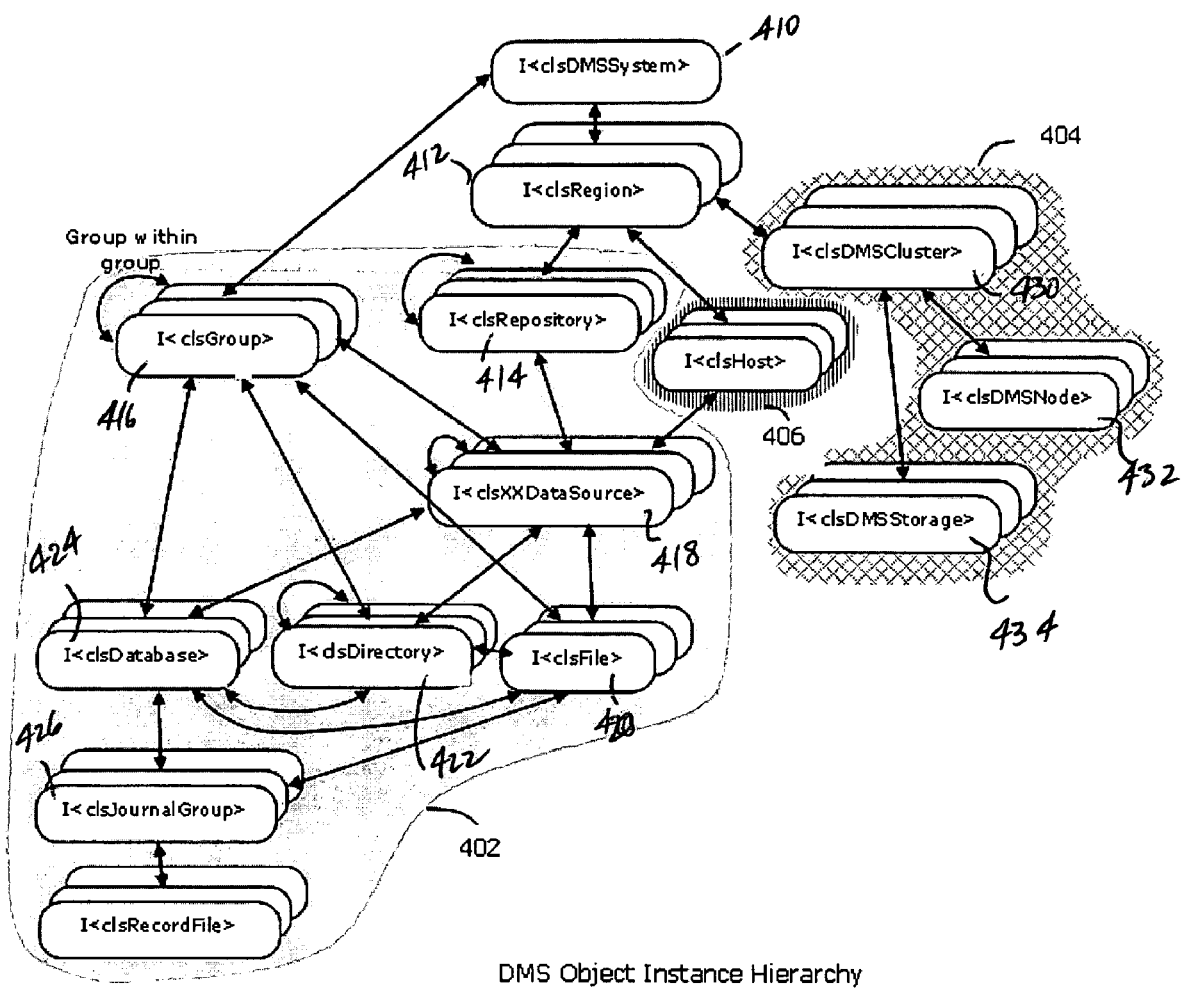
FIG. 4 illustrates a representative DMS object instance hierarchy.

FIG. 4 illustrates a relationship among DMS active objects. This diagram does not show any object history (object versions). Policy profile and policy override objects are also not shown in this figure to avoid complexity.

In FIG. 4, an active object instance is represented by I <object schema> (note that a schema is the same as a class; it is the definition of an object). The "I" stands for instance, and object schema is the definition of that object class. As illustrated, there is only one instance of the DMS system object 410 (i.e. one DMS network). As illustrated, one or more regions 412, and zero or more functional groups 416 can be created under the DMS network. As noted above, the region and group active objects are used for storing configuration information about the region and the functional group. Functional groups may have sub-groups (i.e. group within group). Data repositories 414 can be created under a region 412. Much like groups, repository may have sub-repositories 414, as has been described. Protected data sources 418 reside within a repository 414. Data may be streamed into a data source from a protected host server, or streamed into a data source from another DMS data source through remote distribution service provided by the DMS. A data source may be configured to replicate to a remote repository. Within a data source 418, the real-time history of data files 420, directories 422, databases 424, database journals 426, email databases, email messages, and the like, are captured and indexed. The groups 416, repositories 414, protected data sources 418, and the data objects within the data sources are known as the data network 402. Although not shown in this diagram, policy can be assigned to all the objects in the data network and all the objects above the hierarchy of the data network. Preferably, policies are enforced in hierarchical order and with specific override rules.

Whenever a DMS host driver is installed into a host server, the host driver reports to the DMS, and this operation results in an instance of host object 428 being created in the DMS. As noted above, preferably a host object 428 contains information such as the host OS and platform about the host server. Once a host object is created, IT administrators can identify host data to be protected, and then configure for the host data to be protected. An IT administrator can also configure for DMS protected data to be replicated to a host server. As noted above, the host active object refers to the data source(s) that are protected from its host server or data sources that are replicating to its host (as illustrated by the link between 418 and 428). The host objects in the DMS form an external host server network 406.

A region may have one or more DMS clusters, with all DMS clusters preferably tracked by the DMS via DMS cluster active objects 430. Each cluster has a representation active object that refers to the node active objects 432 and storage active objects 434. The cluster object also contains cluster statistic and status information. A node object 432 contains configuration information, statistics and status about the node. The storage object contains storage volume information, and storage group information. Volume information includes all the raw storage volumes that are provisioned to the DMS. It also includes the DMS partitioning of the raw storage volumes, and the assignment of the partitions to storage groups. In the DMS, a protected data source has its own storage space that is called a storage group. A storage group is an aggregated DMS storage partitions carved out from the volume groups. The cluster, storage, and node objects form a DMS server network 404.

DMS Object Store Indexing

Figure 5:
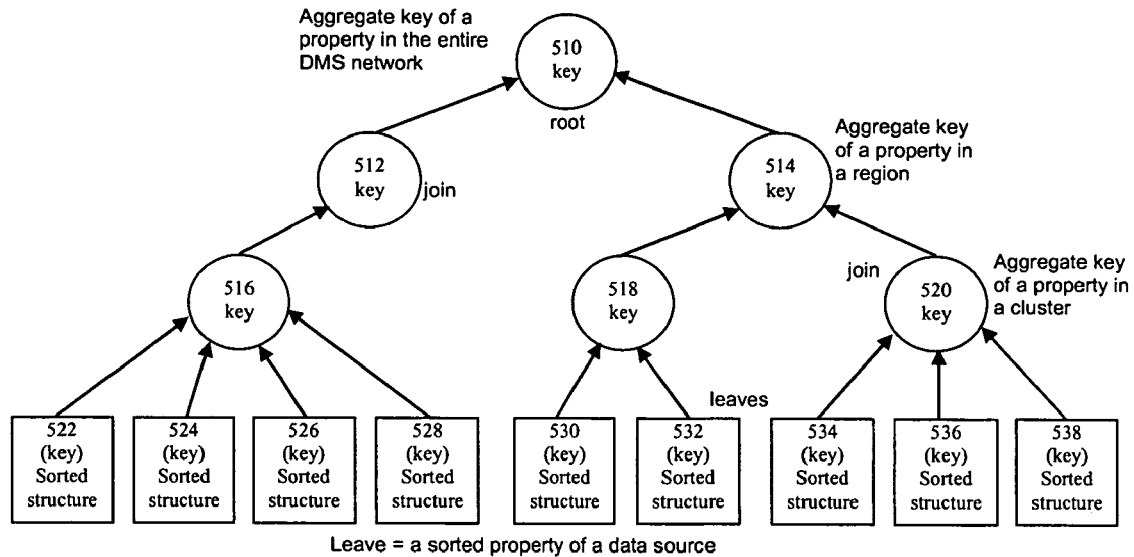
FIG. 5 illustrates an index tree for a given active object property according to the present invention.

According to the present invention, the DMS active object store provides an indexing service to the active objects. In an illustrative embodiment, any object property that has an index-able attribute is indexed and, as a result, the property becomes searchable. The DMS preferably provides hierarchical distributed indexing using index trees to facilitate searching in a highly efficient manner. One such index tree is illustrated in FIG. 5. As will be seen, preferably a given index tree is based on the distributed DMS object hierarchy such as shown in FIG. 4, and there is one index tree for every indexable property define. Preferably, and as will be described, an index entry also has a time dimension so that the index tree may be used to locate an object in the distributed DMS active object store across time.

Figure 6:
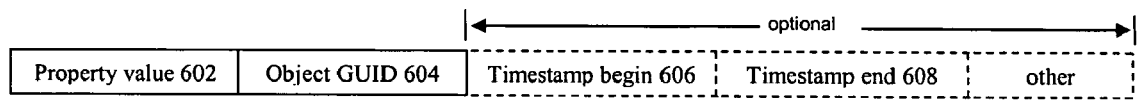
FIG. 6 illustrates a representative sorted structure entry of the index tree of FIG. 5.

As illustrated in FIG. 5, the index tree 500 has a set of leaves 522, 524, 526, 528, 530, 532, 534, 536 and 538 at bottom. As illustrated, each of these leaves is a sorted structure such as a BTree, B+Tree, a simple sorted list of entries, or the like. Each sorted structure also has a membership hash key. A sort entry 600 (FIG. 6) in the sorted structure preferably comprises an object property value 602, an Object GUID 604 (the GUID of the object to which the value belongs), a timestamp 604 when the property value was set, a timestamp 606 when the property value was removed, and the like. The sorted structure may sort its entries in ascending or descending order using the property value. In this way, DMS can locate an object of a specific property value very quickly. A sorted structure has an associated hash key. The hash key of a sorted structure may be zero initially, however, as sort entries are added to the sorted structure, preferably the key changes according to a given algorithm, such as: Key=MembershipHash (current key, operation, hash function(s), new member property value), where "operation" is a given function such as insertion, deletion, or the like. The "hash function(s)" are one or more multiple functions that are well-known in the art; representative functions include, without limitation: cryptographic hashes such as MD4, MD5, SHA-1, or non-cryptographic hashes such as CRC, checksums, and the like. The "new member property value" is that value associated with the new item being added to the sorted structure. The output of the algorithm is a new hash key of the sorted structure (i.e., after the new entry is added). An example of a membership algorithm that may be used for this purpose is the Bloom Filter algorithm, although any known or later-developed membership algorithm may be used for this purpose. Further details regarding a Bloom Filter are discussed in the article "Space/time Trade-offs in Hash Coding with Allowable Errors" by Bloom B. published in Communications of the ACM, 13(7), 422-426. DMS applies membership hashing and a testing algorithm, such as a Bloom Filter, in a hierarchical and distributed fashion.

The following illustrates how the MembershipHash( ) algorithm may be implemented, although any convenient technique may be used. Assume that the "current key" K is 10 KB in length, that the "operation" is an insert, that there are four (4) hash functions, f1, f2, f3 and f4, and that the new member property value is "foo," and that there are four (4) hash functions, f1, f2, f3 and f4. A Bloom Filter generates a set of values: o1=f1(foo), o2=f2(foo), o3=f3(foo) and o4=f4(foo), and the filter turns on a bit in K at offset o1, o2, o3 and o4 as follows: On(K,o1), On(K, o2) and so forth. If an MD5 hash is used, the algorithm can simply apply the function to foo, e.g., MD5(foo), with the resulting 128 bits then be divided into four (4) parts to form o1, o2, o3 and o4. Where the "operation" is delete, there are several ways to implement the filtering algorithm. In one approach, it is desirable to have a long membership key to reduce the possibility of collisions. In this case, the delete operation results in a string Off(K,o1), Off(K,o2), . . . to turn off the given bit in the current key K. The membership key may then be periodically recomputed (starting from zero) to reduce the possibility of false negatives. In an alternative approach, the delete operation may be implemented by accumulating all deletes and using a batch operation. Yet another approach is to create a membership delete key such, when a delete occurs, the routine can add the value key to be deleted into the delete membership key. Periodically, the delete member key may be re-set to zero.

Preferably, the membership hash key is used by a search algorithm in a known manner to determine whether a particular entry exists in a sorted structure. In particular, a membership test algorithm tests whether a given membership hash key exists as follows: Exist=MembershipTest (key, search value). Thus, for example, the membership test might be implemented by inserting the search value into such expressions as: MembershipTest (RegionKey, "foo") or MembershipTest (ClusterKeyA, "foo"). When DMS (or some component thereof) wants to locate an object in a sorted structure using a property value, the MembershipTest( ) function is used to test if the object exist in the sorted structure. Typically, the function returns a TRUE or FALSE value. If FALSE, the search value does not exist in the sorted structure. If TRUE, however, the search value may be in the sorted structure, but this is not guaranteed as there is a possibility of a false positive depending on the algorithm, key length, and the like. In the index tree as illustrated in FIG. 5, one or more "joins" 510, 512, 514, 516, 518 and 520 are located above the sorting structures in the tree. Preferably, a given join holds only a membership hash key, which may be a Bloom Filter construct (although this is not required). As an entry is inserted into a sorted structure (in a given leaf), the key of all the joins that connect the sorted structure up to the root of the index tree are then modified. For example, when a new entry is added to the sorted structure 538, the key of the joins 520, 514, and 510 are re-computed. In a representative embodiment, the key of each join may be created using the following algorithm: Key= MembershipKeyMerge (Key, all the keys in the hierarchy below the Key). A representative expression is MembershipKeyMerge (RegionKey, all the cluster keys in the region), or the like. As a more specific example, using the Membership- KeyMerge( ) function, the key of join 520 is generated using the key of 534, 536 and 538. The key of join 514 is generated using the key of joins 518 and 520, and so forth. As noted above, although the Bloom Filter algorithm is illustrated and described, another membership algorithm may use a different approach but remain within the scope of the inventive technique. Where a delete membership key is used, the MembershipTest( ) may test positive on (member key) and test negative on (delete member key).

According to the invention, a DMS index tree maps into both a logical data network and a physical DMS network. The leaves (i.e., the sorted structures) map to logical data in a data source and the joins are used to aggregate the leaves. In DMS, a join above one or more leaves may aggregate leaves that are in a given DMS cluster, and join on a next level up may aggregate the joins of multiple clusters that belong to a given DMS region. The joins thus map to a physical DMS network. In an alternative embodiment, the DMS may separate a data source into multiple sorted structures, or the DMS may use a join to aggregate a sub-group of leaves in a cluster and then use a join on the next level to aggregate all the sub-groups in a given DMS region. All of the variants are within the scope of the invention, of course.

Figure 7:
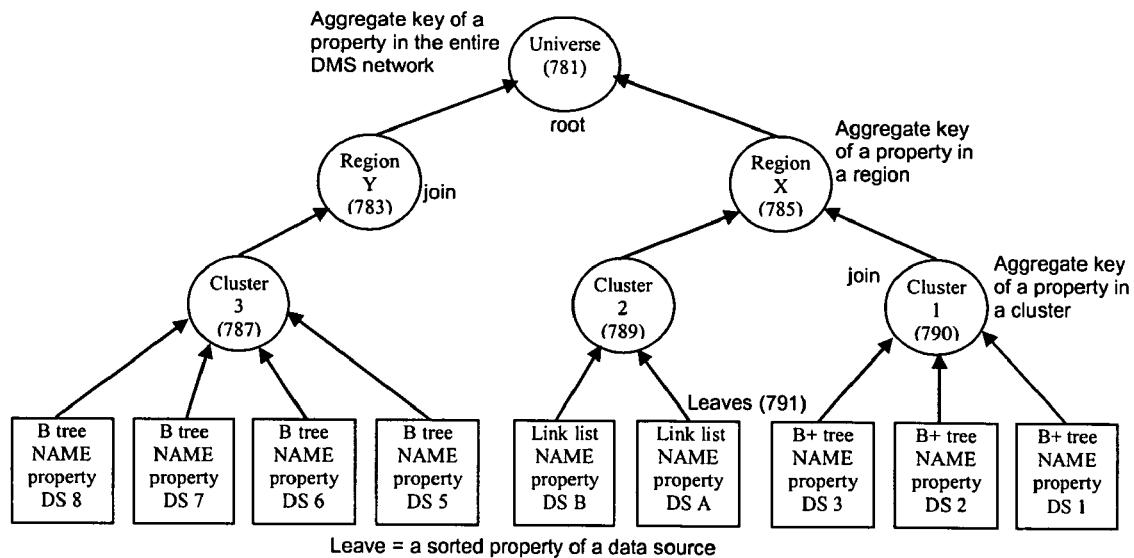
FIG. 7 illustrates a representative index tree for a given NAME property of a given object in the DMS network.

In a preferred embodiment, the mapping of an index tree to logical data network occurs on the leaves (i.e., the sorted structure) of the index tree. Preferably, DMS provides a sorted structure to an index-able property of an Active object class in a protected data source. For example, assume that the NAME property of a clsFile object is index-able and that there are nine (9) protected data sources (each a DS) across three (3) clusters in two (2) regions. In such case, an index tree for the NAME property of the clsFile object is created in the DMS such as illustrated in FIG. 7. In this example, DS1 may be a protected data source of a folder X from a host Y; folder X is a most current state of the data, and DS1 contains the current state and the history of X. A specific sorted structure is created for all the file (i.e., clsFile instances) objects of DS1. FIG. 7 also illustrates that the sorted structure of the NAME property does not have to use the same sorting algorithm, for example, one sorted structure may use B+tree, one another one uses a linked list, and so on. Moreover, although not shown, an index tree may merge an index-able property of multiple object classes, e.g., a merged index of Active objects of all type of classes including clsFile, clsDirectory, clsDatabase, and so forth. As mentioned above, the joins in the index tree aggregate the sorted structures of multiple data sources from one or more clusters, within and across multiple regions. Thus, in this example, the joins 787, 789 and 790 aggregate sorted structures within given DMS clusters, and the joins 783 and 785 aggregate the index of the clusters into a region level, and join 781 aggregates the regions.

In one embodiment, an Index Manager (e.g., software in the form of a set of instructions executable in one or more processor(s)) runs on each DMS cluster. An Index Manager 225 (as shown in FIG. 2) is responsible for maintaining the sorted structures in the particular DMS cluster. In particular, the Index Manager adds new property entries into the appropriate sorted structure, removes entries, or modifies the entries as requested by the active objects. When an entry is added, moved, or modified, the Index Manager for the cluster re-calculates the membership key for the individual sorted structure, as well as the membership key for the overall DMS cluster (i.e. the key for the join). Moreover, as has been described, preferably the membership key for the DMS cluster also is re-calculated using all the membership keys of the sorted structures of the index tree that are within the cluster. For example, and with reference to FIG. 7, if an entry in DS1 changes, the Index Manger of cluster 1 in region X re-calculates the membership key for DS1; the Index Manager then re-calculates the DMS cluster membership key in join 790. The membership key for join 790 is re-calculated using the membership keys of DS1, DS2, and DS3. Once the cluster membership key is re-calculated, an Index Manager in the DMS network may propagate the cluster membership key (and/or membership keys of their protected data sources) to one or more other Managers for one or more other clusters. When an Index Manager receives a membership key of another cluster, or when its own cluster key changes, that Index Manager re-calculates the membership keys of the associated region, and it also re-computes the membership key for the universe; the results (e.g., a copy of the region and universe membership keys) are stored in its local storage. In a representative embodiment, the Index Manager calculates a region membership key by merging the associated cluster membership keys, and it calculates a universe key by merging all the region keys. Again with reference to FIG. 7, an Index Manager at cluster 1 (join 790) uses its own key and the key from cluster 2 (join 789) to generate a region X key (join 785) if either one or both of the keys are changed. Concurrently, cluster 2 (join 789) may use its own key and a key from cluster 1 (join 790) to calculate its own copy of region X key (join 785). The Index Manager of cluster 1 (join 790) would also compute a membership key of region Y (join 783) if, for example, it received the cluster key of cluster 3 (join 787). Preferably, the Index Managers also use all the keys of all the regions to create a key for the universe (join 781). Thus, in the preferred embodiment, each Index Manager in the DMS only has visibility to the sorted structures in its own cluster, but all Index Managers maintain a copy of an index tree that contains all membership keys.

Figure 8:
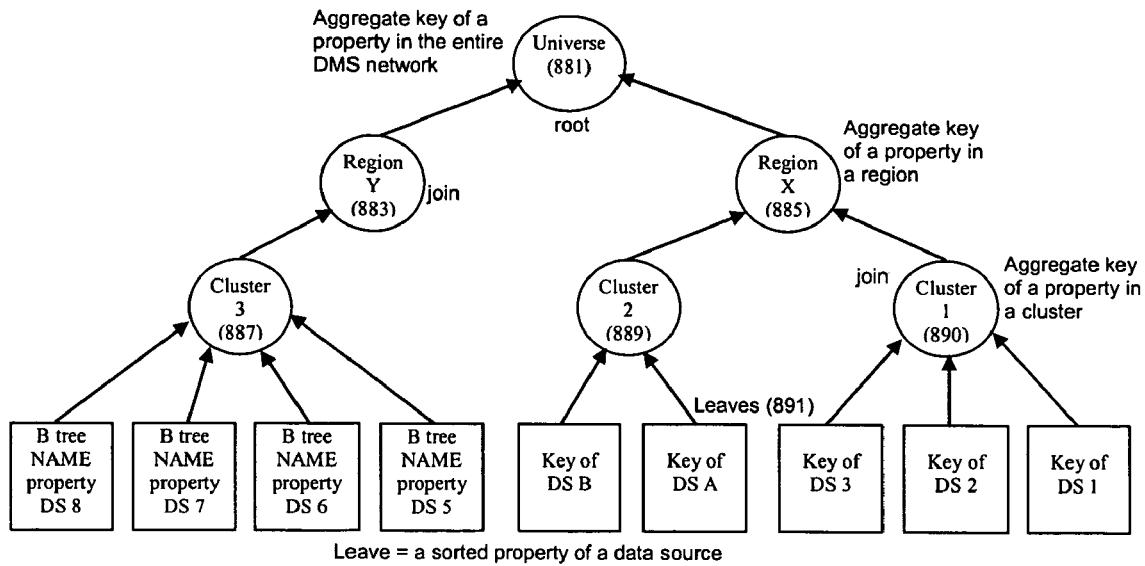
FIG. 8 illustrates an index tree for the given NAME property of the given object in a given cluster after data source keys have been propagated throughout the DMS.

When an Index Manager propagates its cluster membership key (as well as all the keys of its protected data source(s)), other Index Managers in the DMS network can build up their index trees. As noted above, a given Index Manager's (through its index tree) only has access to the sorted structure entries of its own cluster. FIG. 8 shows the index tree that is owned by the Index Manager of cluster 3 (associated with join 887) in this example. Here, the Index Manager only propagates its cluster membership key but not the key of the data sources. In this example, the other Index Managers in the DMS network (i.e., those other than the cluster 3 Manager) do not know about the protected data sources of this Index Manager. In like manner, the copy of the index tree owned by the Index Manager for cluster 3 would not have the key of the sorted structure of the other clusters.

In another embodiment, a given Index Manager propagates its data source keys to all the other Index Managers in the DMS network, although it does not necessarily calculate the membership keys of the clusters and the regions. In this embodiment, when a search request arrives, the given Index Manager performs a membership test on all the data source keys to locate a target data source. Once a target data source is located, the Index Manager either traverses the sorted structure directly (if the sorted structure is local), or the Index Manager makes a request to a remote Index Manager to locate the entry. This search functionality will be described in more detail below.

The above key management examples are merely exemplary, as the present invention contemplates any convenient mechanism to manage keys. Thus, as another alternative, a selected Index Manager in a region may be used to calculate and maintain a copy of a region key while another Index Manager calculates and maintains a copy of the universe key. By doing so, no Index Manager in the entire DMS owns a full copy of the index tree. Yet, as another alternative, a given Index Manager of a cluster may be used to request key(s) from the other Index Managers and to calculate region and universe membership keys on demand, such as when a search request arrives at the given Index Manager.

With the above as background, the following describes how the index trees can be used to respond to search requests. With reference to FIG. 8, and assuming that the keys of the protected data sources have been propagated, assume that a search request (e.g., LOOKUP clsFile NAME="foo") arrives at any one of the DMS nodes in a cluster. In response, the Index Manager in the node traverses its index tree, starting from the universe down to the region, cluster, and the sorted structure, to perform the membership test. Thus, in this example, the Index Manager first tests the requested object ("foo") using the universe membership key (join 881). If the test fails, the Index Manager declares that the search value does not exist in the entire network, and no more processing is required. If the test on the universe key is successful, then the Index Manager performs a membership test on the region membership keys (in joins 883 and 885); whichever test returns TRUE, the Index Manager may traverse further down the tree to perform more membership test on the cluster and, finally, on a given sorted structure within a cluster. A FALSE result from the membership test on any of the membership keys results in the associated branch of the index tree being eliminated for further traversal and search. Only the sorted structure whose membership key agrees with the search criteria during the membership test has to be iterated and searched. This means that searching for an object in an entire DMS network with a very large number of objects takes a very short amount of time and is highly efficient.

Figure 9:
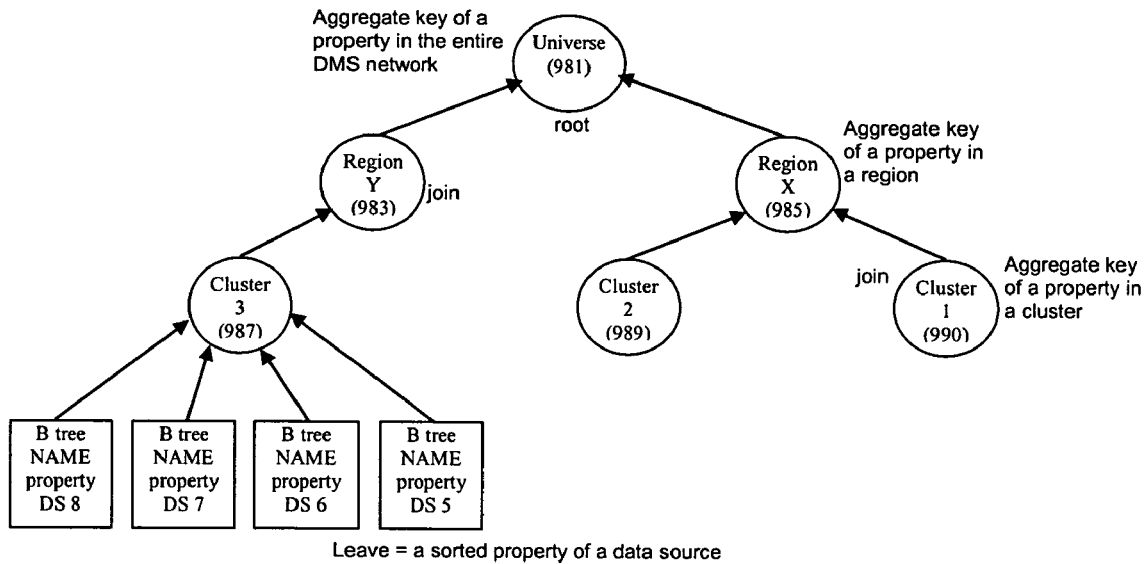
FIG. 9 illustrates the index tree for the given NAME property of the given object in the given cluster where the data source keys have not been propagated throughout the DMS.

As illustrated in FIG. 9, assume that "foo" is located in DS8 and a LOOKUP request for "foo" arrived at cluster 3 (associated with join 987). The Index Manager at cluster 3 eventually traverses down to data source DS8, and then it traverses the sorted structure to locate and return (to the requesting entity) the entry associated with "foo". From that entry, an administrator or other entity can use a GUI or other command line interface (CLI) to locate the object.

In the alternative, assume that "foo" is located in DS1 and that, as before, a LOOKUP request for "foo" arrived at cluster 3 (associated with join 987). The Index Manager at cluster 3 traverses its index tree and finds a membership match in the key of DS1. The Index Manager at cluster 3 then contacts the Index Manager of cluster 1 (associated with join 990) to search the DS1 sorted structure to locate the entry. If data source keys are not propagated, the Index Manager of cluster 3 has the index tree of FIG. 9 in which case it can only determine that "foo" is in cluster 1; in this case, the Index Manager of cluster 3 sends a request to the Index Manager at cluster 1 to search cluster 1. Index Manager at cluster 1 then performs the membership key matching to locate the sorted structure where the "foo" entry resides.

As mentioned above, preferably an entry in the sorted structure has a property value, an associated object GUID, and other information such as the creation and expiration time of the object. By adding more items in a sorted entry, a search request may have more one or many qualifiers, e.g., LOCATE "foo," LOCATE "foo" as of Jan. 25, 2001, LOCATE "foo" that is a given "design document," and so forth. By having more qualifiers items in an entry, multiple dimensional searches can be achieved. Thus, according to a feature of the present invention, if an object's creation and/or termination time is within the sorted entry, an object can be located both across time (history) and space (the object's physical and logical location). This feature of the present invention provides significant advantages. In particular, because the DMS is used for tracking object history, the ability to track temporal and spatial characteristics allows the DMS to index an object's property with a timeline so that the system can locate an object at a previous point-in-time when that particular property had a specific value.

As mentioned above, an Index Manager may propagate the membership keys of the sorted structure in its cluster to other Index Managers. Preferably, a given Index Manager may only propagate its cluster membership key to other Index Managers. Moreover, preferably a given Index Manager pre-calculates the aggregated membership keys for all the DMS regions and the DMS universe individually and maintains its own copy of the index tree. Alternatively, as has been described, only selected index manager(s) may calculate and store membership keys for the regions and the universe. Yet another alternative is for the membership keys of the regions and universe to be calculated on demand during a given search request. Once again, all of these variants are within the teachings of the present invention.

Figure 10:
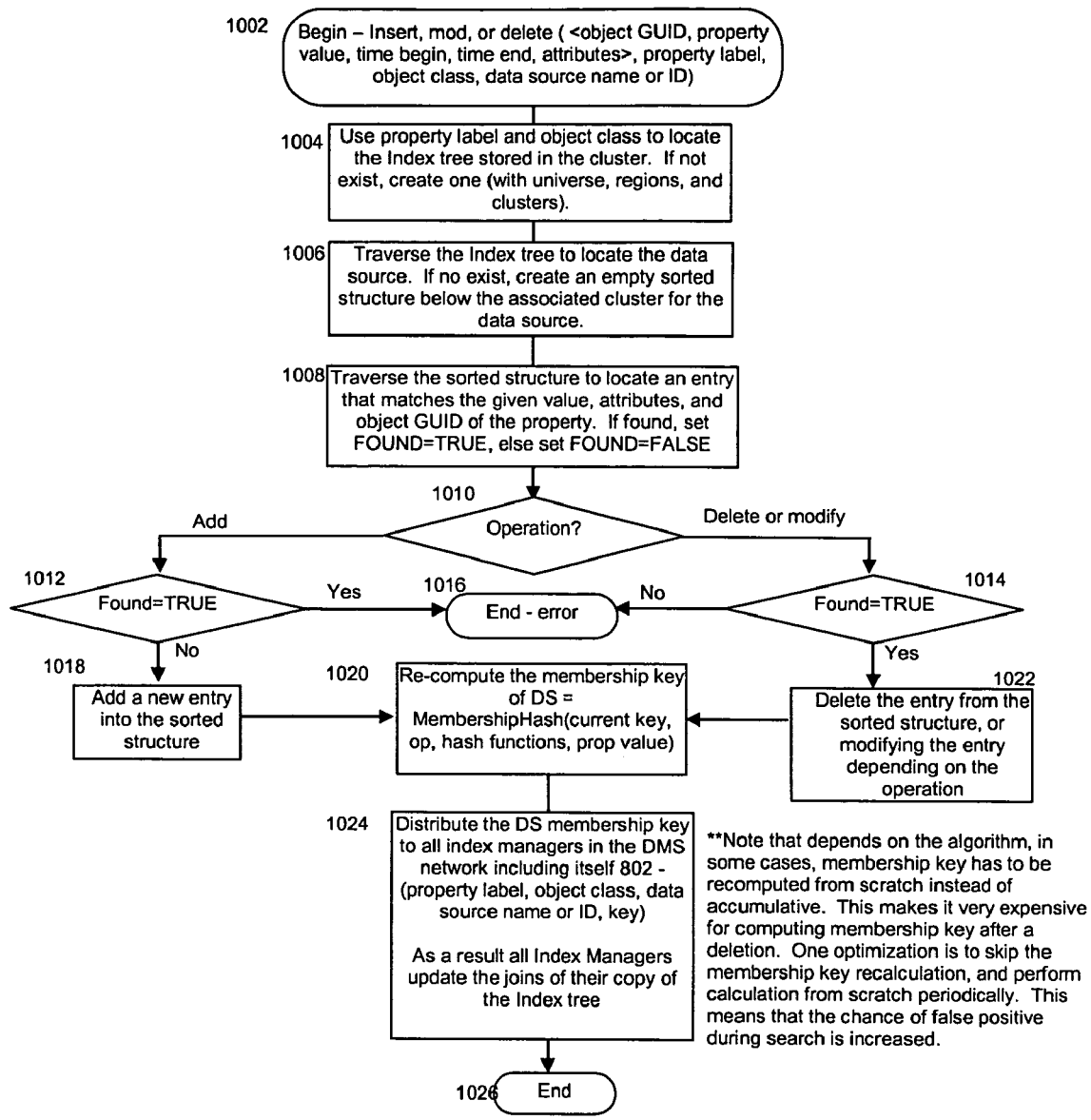
FIG. 10 is a flowchart illustrating how a given Index Manager process in a cluster adds, modifies, or deletes entries in a given index tree.
Figure 11:
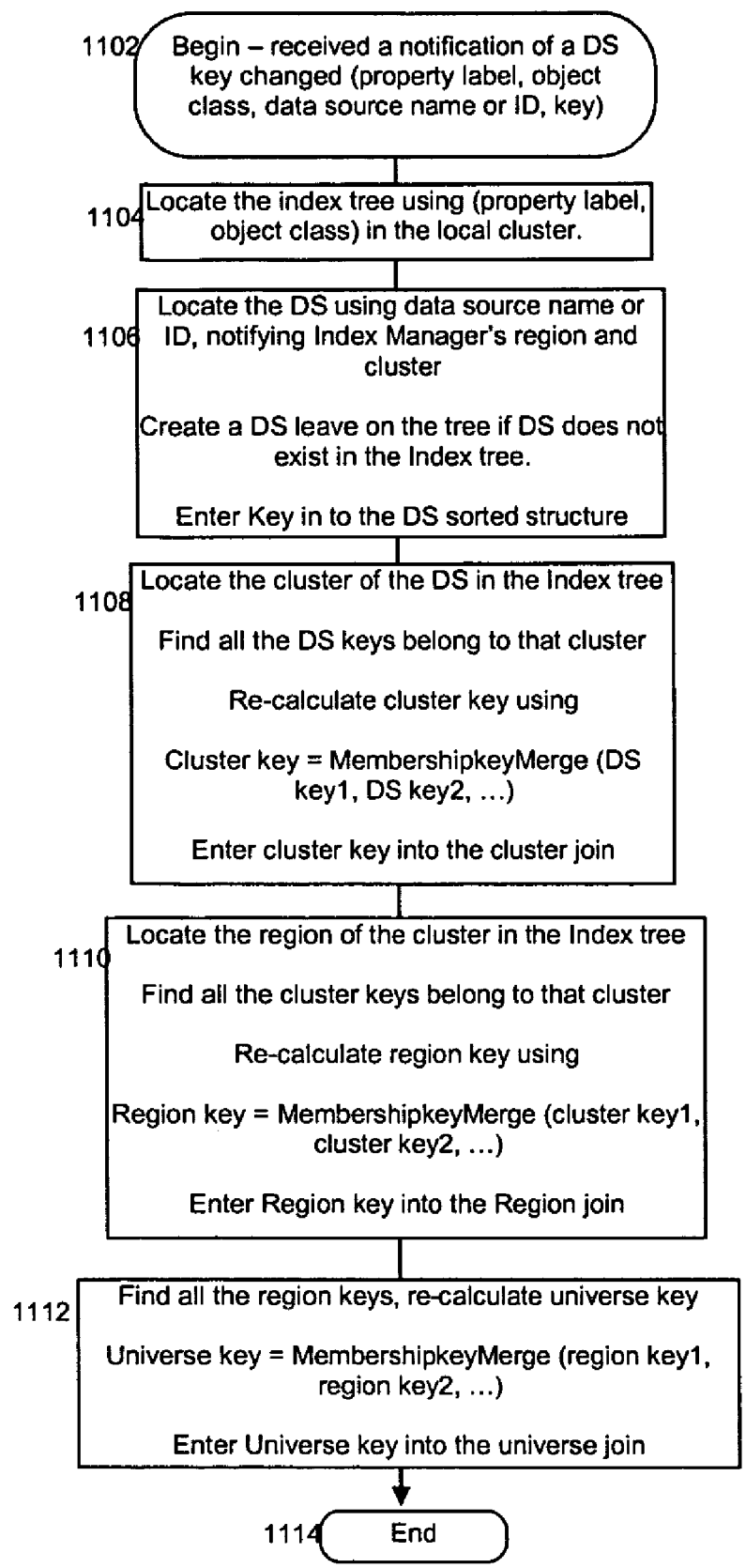
FIG. 11 is a flowchart illustrating how a given Index Manager process re-computes its cluster, region and universe membership keys upon receiving notification of a data source key change from another DMS Index Manager.
Figure 12:
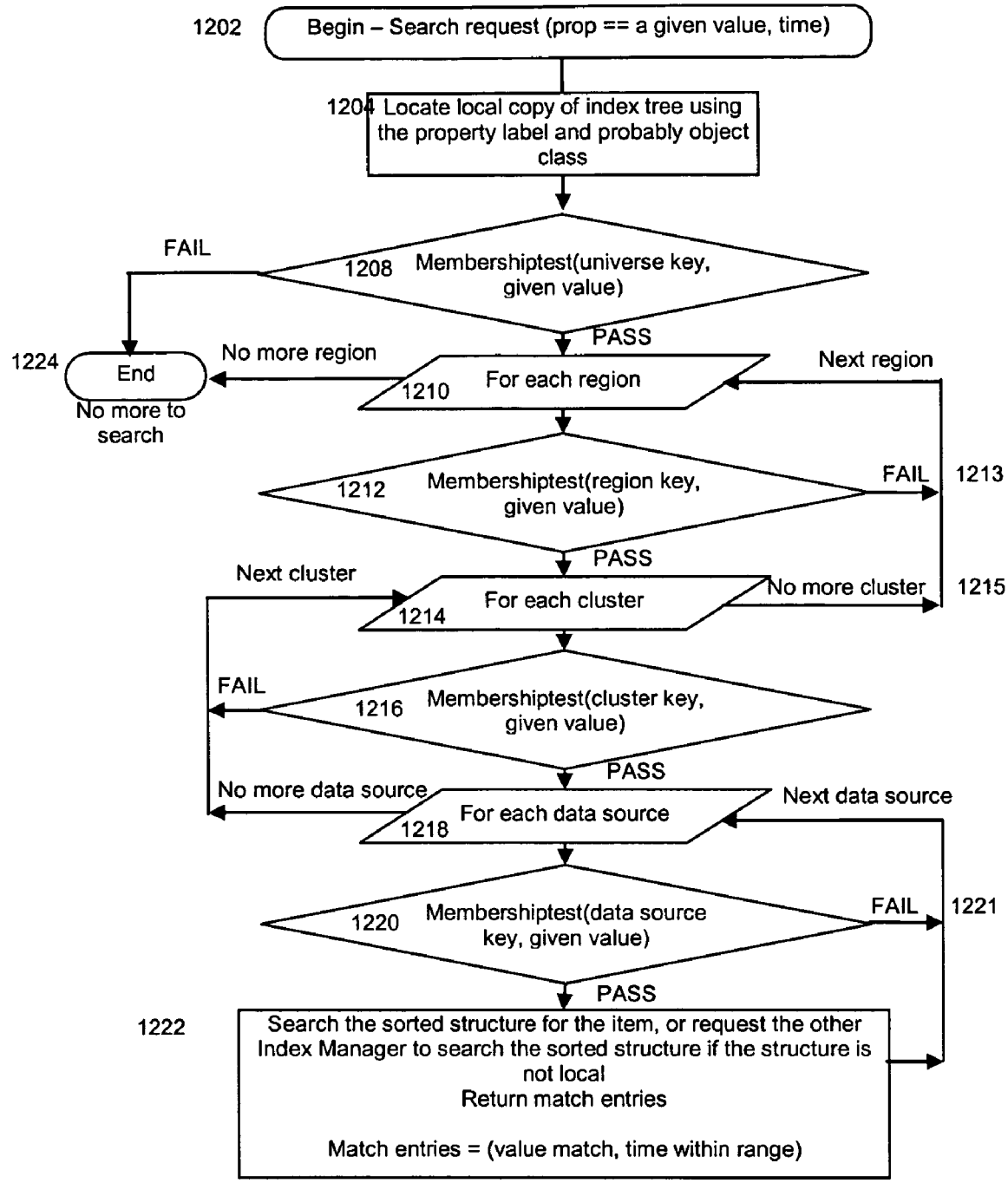
FIG. 12 is a flowchart illustrating how an Index Manager indexes through a local index tree in response to a search request to determine whether it has a local copy of an active object associated with the search request.

The process flow diagrams in FIGS. 10-12 illustrate the functionality of the Index Manager. In particular, FIG. 10 illustrates how an Index Manager provides an indexing service in a given DMS cluster. When the index-able property of an object is modified, when an object is created, or when an object is deleted, the Index Manager receives a request from the object to update its index tree. FIG. 10 only shows a simple indexing process where the index tree does not have a multiple common property value (i.e., multiple entries with the same property value). The routine begins at step 1002 with the process of inserting, modifying, and deleting an indexable property entry into the index tree. At step 1004, the routine uses a property label and object class to locate the index tree stored in the cluster. If the index tree is a merged index of multiple object classes, then the property label alone would be enough to locate the tree. At step 1006, the Index Manager tries to locate the associated data source in the index tree; if the object belongs to a new data source, a new sorted structure is created during this step. Once the sorted structure is located (or created), the Index Manager traverses the sorted structure to locate an entry of the same property value and to set the value appropriately. This is step 1008. A test is then performed at step 1010 to determine the type of operation. If the operation is a delete or modify, then the outcome of the test at step 1014 is positive and the entry is removed from the sorted structure or the entry is updated according to the operation in step 1022. Note that a modification operation may be used to set the End Timestamp and other attributes associating the object property entry. If the operation is an insert, then the outcome of the test at step 1012 is positive and the new entry (with the value, time stamps, and other attributes) is added into the sorted structure in step 1018. If the result of either test 1012 or 1014 is negative, an error is returned at step 1016. After either step 1018 or 1022 (i.e., after the sorted structure is modified), the routine continues at step 1020 to re-calculate the membership key of the data source. At step 1024, the new membership key is distributed to all Index Managers in the DMS network including the Index Manager itself. As also indicated in step 1024, as a result of this distribution all Index Managers then update the joins of their copy of the index tree to complete the process. This specific update process is shown in FIG. 11

It should be noted that the process flow of FIG. 10 may be readily modified to handle the situation where a multiple common property value entry is allowed. In such an embodiment, the routine would also verify an object GUID during deletion, and to allow for multiple property value insertion.

As noted above, FIG. 11 illustrates a process executed by an Index Manager upon receiving a data source membership key (e.g., from another Index Manager in the DMS). Thus, the processes illustrated in FIGS. 10-11 results in the Index Managers in the DMS network each maintaining their own copy of the index tree (as shown, for example, in FIG. 8) where all copies of the index tree are complete tree except that each Index Manager only has access to its local sorted structure(s).

The routine of FIG. 11 begins at step 1102 when the Index Manager receives a notification of a data source (DS) key change. In response, the Index Manager continues at step 1104 and locates the local copy of the index tree using, e.g., the property label and/or object class. Once the tree is located, the Index Manager locates the leaf (i.e., the sorted structure associated with the data source), which is step 1006. If this data source is remote to the Index Manager, and the data source is new, the data source leaf may not be found, in which case the Index Manager creates a new leaf for the index tree. The membership key of the data source is entered into the leaf (i.e., into the sorted structure if the data source is local). The routine then continues at step 1008. At this step, the Index Manager locates the cluster join, which is the parent join of the data source leaf in the index tree. The Index Manager locates all the data source leaves that belong to the same cluster join. The Index Manager then uses all the data source keys to re-calculate the cluster membership key. It then enters cluster key into the cluster join. The routine then continues at step 1010. At this step, the Index Manager traverses up the index tree to locate the region join and to locate all cluster joins that belong to the same region. It then re-computes the region membership key and enters the re-computed region key into the region join. The routine then continues at step 1112. At this step, the Index Manager finds all the region keys and, using these keys, re-computes the universe key. The universe key is then entered in the universe join to complete the process.

FIG. 12 is a flowchart diagram illustrating how the present invention processes a simple search request, e.g., in the form of: LOCATE object with "a property=some value." The routine begins at step 1202 when the search request arrives. At step 1204, the Index Manager uses given information, e.g., the property label and/or object class, to locate the local copy of index tree. The object class data is not necessary if the index tree is associated with an indexing property across multiple object classes. At step 1208, the Index Manager performs a membership test against the universe membership key using the given lookup value. If the membership test fails, the Index Manager is certain that the object does not exist in the DMS at all, and the search is terminated. This is step 1224. If, however, the outcome of the test at step 1208 is positive, the object may exist somewhere in DMS. The routine then continues at step 1210 for each DMS region. In particular, for each region the routine executes a test at step 1212 to perform a membership test against the region membership key using the given lookup value. Thus, the membership test is performed using the given lookup value against the membership key of all the regions, in particular, by iterating through each region. If a membership test of a region membership key is negative, no more searches are needed for that region (step 1213); if, however, a membership test of a region membership key is positive, the Index Manager proceeds into the next level within that region to perform a membership test using the given value against the membership key of the clusters in the region. This is illustrated in steps 1214 and 1216. When all the clusters within the region are iterated, the Index Manager moves on to test next region (at step 1215). If the membership test fails during testing the membership key of the clusters, the Index Manager knows that the object does not exist in the cluster and that cluster is skipped. If the test against the cluster passes, however, the Index Manager proceeds down one more level to test the membership key of all the data sources in the cluster against the given value. This is described in steps 1218 and 1220. When all data source keys within the cluster are tested, the Index Manager moves on to evaluate a next cluster 1221. When Index Manager locates a data source whose membership test against the given value passes, it determines that the object with the value may reside in the sorted structure. At that point, if the sorted structure is local, the Index Manager iterates the entries in the sorted structure to locate and return the object. If the sorted structure is not local, the Index Manager contacts a remote Index Manager to have the remote Index Manager iterate the entries and return the matching object(s). This is step 1222. A matching object is one which property value matches the queried value, and which property lifetime (begin and end timestamp) covers the queried point-in-time.

A search request may be complex, in which case the process illustrated in FIG. 12 must be varied. For example, a request may be "LOCATE an object which NAME="foo" in Jan. 12, 2001." This particular request (which is merely representative of course) involves looking up object "foo," and then checking if an associated object timeline (if one is included) spans the given time. Yet, another example of a request might be "LOCATE an object which has the NAME=*.doc". In this case, no search elimination can be done and the Index Manager would have to iterate all the sorted structures by issuing distributed search query to all the Index Managers in the network. Another search request such as "LOCATE an object which property X>500" is yet another example where search elimination using membership key cannot be done readily. More complicated search requests such as "LOCATE an object in Cluster A, which NAME="foo" or property X>500" or "LOCATE an object in Region B, which NAME="foo" and property X>500" typically need to be decomposed so that a search can be done in partition. Generalizing, a given search requests may also be performed with respect to a data source, a repository, a region, or the entire DMS network. Thus, for example, one may want to look for a given object only in one region, in which case, the search process can target only that region.

The distributed index tree of membership keys can be used to optimize a search process through search elimination (i.e., when a given membership test fails). According to this aspect of the invention, search elimination is useful when a search request involves looking for a property with a specific value. Search elimination can apply to a simply request or a compound request. The distributed nature of the index tree and the cooperative Index Manager can efficiently managed distributed search even when elimination cannot be done.

While the present invention has been described in the context of a method or process, the present invention also relates to apparatus for performing the operations herein. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described my invention, what I now claim is as follows:

1. A data structuring method operative in a data management system organized into one two or more physically-dispersed regions, with each region comprising one or more clusters, and wherein a given cluster includes one or more nodes and a shared storage, and wherein the nodes receive data streams continuously and store such data streams in an object-oriented data store, comprising:

for a defined object property, generating maintaining an index tree for use in locating determining where a given object in the data management system is located, the index tree comprising a root, one or more levels of joins, and a plurality of leaves, wherein each leaf is associated with a sorted structure, a join above one or more leaves aggregates leaves that are in a given cluster, a join on a next level up in the index tree aggregates the joins of multiple clusters that belong to a given region, and a join on a next level up in the index tree aggregates the joins of multiple regions that belong to a given universe at the root of the index tree;

associating a key and a key value with each sorted structure in each leaf and with each join in the index tree;

wherein the key is a hash key that is generated by applying a Bloom Filter to at least a current key of a given sorted structure;

responsive to the modification of the given sorted structure:

re-computing the key associated with the given sorted structure;

re-computing the keys of one or more joins in the index tree;

propagating a given cluster key value from a first cluster to a second cluster; and at the second cluster, updating the index tree based on the given cluster key value propagated from the first cluster, wherein the updating includes re-computing at least one key value;

responsive to a given occurrence, updating the index tree by re-computing at least one key value; and responsive to a search request for the given object:

performing a membership test on at least one key in the index tree to identify which of the multiple clusters may have the given object; and using a sorted structure to locate the given object within a given cluster.

2. The data structuring method of claim 1 wherein the sorted structure is one of: a BTree, A B+Tree, and a sorted list of entries.

3. The data structuring method of claim 1 wherein the sorted structure comprises a property value and an object global unique identifier.

4. The data structuring method of claim 1 wherein the sorted structure comprises a temporal value and the method further includes using the index tree to locate a given point-in-time version of the given object in the data management system.

5. The method of claim 1 wherein the given occurrence is receipt of a notification that a key value associate with a given data source in another index tree has been modified.

6. The method of claim 1 wherein the index tree is updated by adding a new leaf to the index tree or modifying an existing leaf.

7. The method of claim 6 wherein the index tree is updated by re-computing a value of a cluster membership key.

8. The method of claim 7 wherein the index tree is updated by re-computing a value of a region membership key.

9. The method of claim 8 wherein the index tree is updated by re-computing a value of a universe membership key.

10. The method of claim 1 wherein at each level of the index tree a membership test is performed to determine whether the search request is associated with a given object in a given portion of the index tree as indicated by the associated key value.

11. The method of claim 10 wherein if the membership test determines that the given object is not associated with a given portion of the index tree, the given portion of the index tree is eliminated from further traversal and search.

* * * * *